US012347281B2

(12) United States Patent
Acres

(10) Patent No.: US 12,347,281 B2
(45) **Date of Patent: *Jul. 1, 2025**

(54) GAMING DEVICE HAVING MULTIPLE GAME PLAY OPTION

(71) Applicant: Acres Technology, Las Vegas, NV (US)

(72) Inventor: John F. Acres, Las Vegas, NV (US)

(73) Assignee: Acres Technology, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,679

(22) Filed: Jun. 30, 2023

(65) Prior Publication Data

US 2024/0078878 A1 Mar. 7, 2024

Related U.S. Application Data

(63) Continuation of application No. 17/317,182, filed on May 11, 2021, now Pat. No. 11,735,012, which is a (Continued)

(51) Int. Cl.
*G07F 17/34* (2006.01)
*G07F 17/32* (2006.01)

(52) U.S. Cl.
CPC .............. *G07F 17/34* (2013.01); *G07F 17/32* (2013.01); *G07F 17/3211* (2013.01); (Continued)

(58) Field of Classification Search
CPC ...... G07F 17/34; G07F 17/32; G07F 17/3211; G07F 17/3213; G07F 17/3225; G07F 17/3244; G07F 17/3246; G07F 17/3267
See application file for complete search history.

(56) References Cited

U.S. PATENT DOCUMENTS

| | | | |
|---|---|---|---|
| 2,669,389 | A | 2/1954 | Mesi et al. |
| 3,124,355 | A | 3/1964 | Mentzer et al. |

(Continued)

FOREIGN PATENT DOCUMENTS

| | | | |
|---|---|---|---|
| CA | 2442442 | C | 3/2007 |
| EP | 0141264 | A3 | 9/1987 |

(Continued)

OTHER PUBLICATIONS

Acres, John: "Measuring the Player Experience: What a Squiggly Line Can Tell You", Inside Edge/Slot Manager, Jan.-Feb. 2009, pp. 28-29.

(Continued)

*Primary Examiner* — Ronald Laneau
(74) *Attorney, Agent, or Firm* — Ballard Spahr LLP

(57) ABSTRACT

Embodiments of this concept are directed to gaming devices that are configured to initiate multiple gaming events in response to a player input. The gaming device may include game initiating inputs that initiate a predetermined number of gaming events in response to the player input, or the gaming device may include configurable game initiating inputs that initiate a number of gaming events specified by the player, specified the gaming device, or specified by a gaming server. The gaming device or gaming server may set the number of initiated game events in response to the occurrence of a triggering event.

20 Claims, 13 Drawing Sheets

Related U.S. Application Data continuation of application No. 16/572,839, filed on Sep. 17, 2019, now Pat. No. 11,024,132, which is a continuation of application No. 15/878,086, filed on Jan. 23, 2018, now Pat. No. 10,445,988, which is a continuation of application No. 15/289,348, filed on Oct. 10, 2016, now Pat. No. 9,911,288, which is a continuation of application No. 14/982,879, filed on Dec. 29, 2015, now Pat. No. 9,483,909, which is a continuation of application No. 14/195,280, filed on Mar. 3, 2014, now Pat. No. 9,251,671, which is a continuation of application No. 12/509,319, filed on Jul. 24, 2009, now Pat. No. 8,702,490.

(52) U.S. Cl.
CPC ...... *G07F 17/3213* (2013.01); *G07F 17/3225* (2013.01); *G07F 17/3244* (2013.01); *G07F 17/3246* (2013.01); *G07F 17/3267* (2013.01)

(56) References Cited

U.S. PATENT DOCUMENTS

| | | | |
|---|---|---|---|
| 3,124,674 | A | 3/1964 | Edward et al. |
| 3,684,290 | A | 8/1972 | Wayne |
| 3,727,213 | A | 4/1973 | Kurtenbach |
| 3,751,040 | A | 8/1973 | Carey |
| 4,240,635 | A | 12/1980 | Brown |
| 4,254,404 | A | 3/1981 | White |
| 4,283,709 | A | 8/1981 | Lucero et al. |
| 4,353,554 | A | 10/1982 | Fisher |
| 4,433,844 | A | 2/1984 | Hooker et al. |
| 4,620,707 | A | 11/1986 | Lippincott |
| 4,624,459 | A | 11/1986 | Kaufman |
| 4,652,998 | A | 3/1987 | Koza et al. |
| 4,657,256 | A | 4/1987 | Okada |
| 4,712,799 | A | 12/1987 | Fraley |
| 4,836,546 | A | 6/1989 | DiRe et al. |
| 4,837,728 | A | 6/1989 | Barrie et al. |
| 4,887,813 | A | 12/1989 | Chiles, III et al. |
| 4,911,449 | A | 3/1990 | Dickinson et al. |
| 5,022,653 | A | 6/1991 | Suttle et al. |
| 5,024,439 | A | 6/1991 | Okada |
| 5,026,058 | A | 6/1991 | Bromley |
| 5,027,102 | A | 6/1991 | Sweeny |
| 5,031,914 | A | 7/1991 | Rosenthal |
| 5,033,744 | A | 7/1991 | Bridgeman et al. |
| 5,046,736 | A | 9/1991 | Bridgeman et al. |
| 5,078,405 | A | 1/1992 | Jones et al. |
| 5,123,649 | A | 6/1992 | Tiberio |
| 5,152,529 | A | 10/1992 | Okada |
| 5,178,395 | A | 1/1993 | Lovell |
| 5,221,083 | A | 6/1993 | Dote |
| 5,265,880 | A | 11/1993 | Maksymec |
| 5,342,049 | A | 8/1994 | Wichinsky et al. |
| 5,364,104 | A | 11/1994 | Jones et al. |
| 5,377,973 | A | 1/1995 | Jones et al. |
| 5,380,008 | A | 1/1995 | Mathis et al. |
| 5,490,670 | A | 2/1996 | Hobert |
| 5,536,016 | A | 7/1996 | Thompson |
| 5,560,603 | A | 10/1996 | Seelig et al. |
| 5,564,700 | A | 10/1996 | Celona |
| 5,584,485 | A | 12/1996 | Jones et al. |
| 5,586,766 | A | 12/1996 | Forte et al. |
| 5,655,961 | A | 8/1997 | Acres et al. |
| 5,655,965 | A | 8/1997 | Takemoto et al. |
| 5,674,128 | A | 10/1997 | Holch et al. |
| 5,695,402 | A | 12/1997 | Stupak |
| 5,697,844 | A | 12/1997 | Von Kohorn |
| 5,704,835 | A | 1/1998 | Dietz, II |
| 5,720,662 | A | 2/1998 | Holmes, Jr. et al. |
| 5,743,798 | A | 4/1998 | Adams et al. |
| 5,758,875 | A | 6/1998 | Giacalone, Jr. |
| 5,766,076 | A | 6/1998 | Pease et al. |
| 5,816,918 | A | 10/1998 | Kelly et al. |
| 5,828,862 | A | 10/1998 | Singkornrat et al. |
| 5,830,064 | A | 11/1998 | Bradish et al. |
| 5,836,816 | A | 11/1998 | Bruin et al. |
| 5,836,817 | A | 11/1998 | Acres et al. |
| 5,851,147 | A | 12/1998 | Stupak et al. |
| 5,910,048 | A | 6/1999 | Feinberg |
| 5,913,726 | A | 6/1999 | Jones et al. |
| 5,934,998 | A | 8/1999 | Forte et al. |
| 5,941,770 | A | 8/1999 | Miers et al. |
| 5,960,406 | A | 9/1999 | Rasansky et al. |
| 5,984,779 | A | 11/1999 | Bridgeman et al. |
| 6,003,013 | A | 12/1999 | Boushy et al. |
| 6,012,983 | A | 1/2000 | Walker et al. |
| 6,024,642 | A | 2/2000 | Stupak |
| 6,030,109 | A | 2/2000 | Lobsenz |
| 6,032,955 | A | 3/2000 | Luciano et al. |
| 6,045,129 | A | 4/2000 | Cooper et al. |
| 6,045,130 | A | 4/2000 | Jones et al. |
| 6,048,272 | A | 4/2000 | Tsujita |
| 6,059,659 | A | 5/2000 | Busch et al. |
| 6,077,163 | A | 6/2000 | Walker et al. |
| 6,086,477 | A | 7/2000 | Walker et al. |
| 6,106,395 | A | 8/2000 | Begis |
| 6,110,041 | A | 8/2000 | Walker et al. |
| 6,110,043 | A | 8/2000 | Olsen |
| 6,135,884 | A | 10/2000 | Hedrick et al. |
| 6,146,273 | A | 11/2000 | Olsen |
| 6,165,071 | A | 12/2000 | Weiss |
| 6,168,521 | B1 | 1/2001 | Luciano et al. |
| 6,183,362 | B1 | 2/2001 | Boushy |
| 6,186,892 | B1 | 2/2001 | Frank et al. |
| 6,186,893 | B1 | 2/2001 | Walker et al. |
| 6,196,918 | B1 | 3/2001 | Miers et al. |
| 6,203,429 | B1 | 3/2001 | Demar et al. |
| 6,210,276 | B1 | 4/2001 | Mullins |
| 6,217,448 | B1 | 4/2001 | Olsen |
| 6,224,482 | B1 | 5/2001 | Bennett |
| 6,234,900 | B1 | 5/2001 | Cumbers |
| 6,254,483 | B1 | 7/2001 | Acres |
| 6,264,560 | B1 | 7/2001 | Goldberg et al. |
| 6,270,409 | B1 | 8/2001 | Shuster |
| 6,287,194 | B1 | 9/2001 | Okada et al. |
| 6,289,382 | B1 | 9/2001 | Bowman-Amuah |
| 6,293,866 | B1 | 9/2001 | Walker et al. |
| 6,293,868 | B1 | 9/2001 | Bernard |
| 6,302,793 | B1 | 10/2001 | Fertitta et al. |
| 6,315,662 | B1 | 11/2001 | Jorasch et al. |
| 6,315,666 | B1 | 11/2001 | Mastera et al. |
| 6,319,122 | B1 | 11/2001 | Packes, Jr. et al. |
| 6,319,125 | B1 | 11/2001 | Acres |
| 6,336,859 | B2 | 1/2002 | Jones et al. |
| 6,347,996 | B1 | 2/2002 | Gilmore et al. |
| 6,364,314 | B1 | 4/2002 | Canterbury |
| 6,368,216 | B1 | 4/2002 | Hedrick et al. |
| 6,371,852 | B1 | 4/2002 | Acres |
| 6,375,567 | B1 | 4/2002 | Acres |
| 6,390,473 | B1 | 5/2002 | Vancura et al. |
| 6,425,823 | B1 | 7/2002 | Byrne |
| 6,428,002 | B1 | 8/2002 | Baranauskas |
| 6,443,456 | B1 | 9/2002 | Gajor |
| 6,454,648 | B1 | 9/2002 | Kelly et al. |
| 6,457,045 | B1 | 9/2002 | Hanson et al. |
| 6,471,588 | B2 | 10/2002 | Sakamoto |
| 6,485,367 | B1 | 11/2002 | Joshi |
| 6,485,368 | B2 | 11/2002 | Jones et al. |
| 6,520,856 | B1 | 2/2003 | Walker et al. |
| 6,558,255 | B2 | 5/2003 | Walker et al. |
| 6,565,434 | B1 | 5/2003 | Acres |
| 6,565,436 | B1 | 5/2003 | Baerlocher |
| 6,569,013 | B1 | 5/2003 | Taylor |
| 6,575,832 | B1 | 6/2003 | Manfredi et al. |
| 6,592,457 | B1 | 7/2003 | Frohm et al. |
| 6,599,186 | B1 | 7/2003 | Walker et al. |
| 6,599,193 | B2 | 7/2003 | Baerlocher et al. |
| 6,606,615 | B1 | 8/2003 | Jennings et al. |
| 6,620,046 | B2 | 9/2003 | Rowe |
| 6,634,922 | B1 | 10/2003 | Driscoll et al. |
| 6,648,757 | B1 | 11/2003 | Slomiany et al. |

(56) References Cited

U.S. PATENT DOCUMENTS 6,652,378 B2 11/2003 Cannon et al.
6,656,047 B1 12/2003 Tarantino et al.
6,695,700 B2 2/2004 Walker et al.
6,697,165 B2 2/2004 Wakai et al.
6,702,670 B2 3/2004 Jasper et al.
6,709,331 B2 3/2004 Berman
6,712,693 B1 3/2004 Hettinger
6,712,695 B2 3/2004 Mothwurf et al.
6,722,985 B2 4/2004 Criss-Puszkiewicz et al.
6,739,973 B1 5/2004 Lucchesi et al.
6,749,510 B2 6/2004 Giobbi
6,751,657 B1 6/2004 Zothner
6,755,420 B2 6/2004 Colton
6,758,754 B1 7/2004 Lavanchy et al.
6,760,595 B2 7/2004 Inselberg
6,780,104 B2 8/2004 Fox
6,786,824 B2 9/2004 Cannon
6,800,026 B2 10/2004 Cannon
6,800,027 B2 10/2004 Giobbi et al.
6,802,778 B1 10/2004 Lemay et al.
6,811,482 B2 11/2004 Letovsky
6,811,486 B1 11/2004 Luciano, Jr.
6,860,808 B2 3/2005 Levitan
6,860,810 B2 3/2005 Cannon et al.
6,878,064 B2 4/2005 Huang
6,939,227 B2 9/2005 Jorasch et al.
6,939,229 B2 9/2005 McClintic
6,944,509 B2 9/2005 Altmaier et al.
6,948,171 B2 9/2005 Dan et al.
6,965,868 B1 11/2005 Bednarek
6,973,665 B2 12/2005 Dudkiewicz et al.
RE38,982 E 2/2006 Forte et al.
6,997,380 B2 2/2006 Safaei et al.
6,998,806 B2 2/2006 Suzuki
7,037,195 B2 5/2006 Schneider et al.
7,056,210 B2 6/2006 Bansemer et al.
7,069,232 B1 6/2006 Fox et al.
7,090,579 B2 8/2006 Tarantino
7,094,149 B2 8/2006 Walker et al.
7,094,150 B2 8/2006 Ungaro et al.
7,103,560 B1 9/2006 Fox et al.
7,105,736 B2 9/2006 Laakso
7,125,333 B2 10/2006 Brosnan
7,131,908 B2 11/2006 Baerlocher
7,144,322 B2 12/2006 Gomez et al.
7,160,188 B2 1/2007 Kaminkow et al.
7,160,189 B2 1/2007 Walker et al.
7,169,052 B2 1/2007 Beaulieu et al.
7,175,521 B2 2/2007 McClintic
7,182,690 B2 2/2007 Giobbi et al.
7,184,965 B2 2/2007 Fox et al.
7,186,181 B2 3/2007 Rowe
7,192,346 B2 3/2007 Mathis
7,195,243 B2 3/2007 Kenny et al.
7,201,654 B1 4/2007 Jarvis et al.
7,210,998 B2 5/2007 Kazaoka et al.
7,251,805 B2 7/2007 Koo
7,258,613 B2 8/2007 Lucchesi et al.
7,264,243 B2 9/2007 Yoseloff et al.
7,300,351 B2 11/2007 Thomas
7,303,475 B2 12/2007 Britt et al.
7,329,185 B2 2/2008 Conover et al.
7,338,372 B2 3/2008 Morrow et al.
7,355,112 B2 4/2008 Laakso
7,361,089 B2 4/2008 Daly et al.
7,374,486 B2 5/2008 Baerlocher
7,410,422 B2 8/2008 Fine
7,416,186 B2 8/2008 Walker et al.
7,458,892 B2 12/2008 Walker et al.
7,585,222 B2 9/2009 Muir
7,594,849 B2 9/2009 Cannon
7,594,851 B2 9/2009 Falconer
7,601,060 B2 10/2009 Baerlocher et al.
7,628,691 B2 12/2009 Luciano, Jr. et al.
7,674,180 B2 3/2010 Graham et al.
7,699,703 B2 4/2010 Muir et al.
7,717,788 B2 5/2010 Rowe
7,765,121 B2 7/2010 Pace et al.
7,775,876 B2 8/2010 Rowe
7,780,520 B2 8/2010 Baerlocher
7,806,761 B2 10/2010 Walker et al.
7,811,167 B2 10/2010 Giobbi et al.
7,846,018 B2 12/2010 Baerlocher
7,874,911 B2 1/2011 Walker et al.
7,963,844 B2 6/2011 Walker et al.
7,980,934 B2 7/2011 Shuster et al.
8,047,908 B2 11/2011 Walker et al.
8,052,517 B2 11/2011 Manfredi et al.
8,057,294 B2 11/2011 Pacey et al.
8,070,582 B2 12/2011 Lutnick et al.
8,186,682 B2 5/2012 Amaitis et al.
8,197,324 B2 6/2012 Walker et al.
8,475,254 B2 7/2013 Acres
8,506,394 B2 8/2013 Kelly et al.
8,523,652 B2 9/2013 Luciano, Jr.
8,657,662 B2 2/2014 Acres
8,678,914 B2 3/2014 Young
8,684,811 B2 4/2014 Acres
8,702,490 B2 4/2014 Acres
8,758,109 B2 6/2014 Lutnick
9,165,435 B2 10/2015 Acres
9,240,094 B2 1/2016 Acres
9,251,671 B2 2/2016 Acres
9,472,064 B2 10/2016 Acres
9,483,909 B2 11/2016 Acres
9,558,625 B2 1/2017 Gadher et al.
9,659,429 B2 5/2017 Acres
9,916,722 B2 3/2018 Acres
9,928,682 B2 3/2018 Acres
9,953,490 B2 4/2018 Acres
10,373,441 B1 8/2019 Halvorson
10,497,219 B2 12/2019 Acres
10,733,834 B1 8/2020 Hiten et al.
10,832,525 B2 11/2020 Cicchi et al.
2001/0004609 A1 6/2001 Walker et al.
2001/0024015 A1 9/2001 Hogan et al.
2001/0046893 A1 11/2001 Giobbi et al.
2001/0048193 A1 12/2001 Yoseloff et al.
2002/0013173 A1 1/2002 Walker et al.
2002/0016202 A1 2/2002 Fertitta et al.
2002/0019253 A1 2/2002 Reitzen et al.
2002/0032052 A1 3/2002 Levitan
2002/0034981 A1 3/2002 Hisada
2002/0039923 A1 4/2002 Cannon et al.
2002/0055381 A1 5/2002 Tarantino
2002/0082076 A1 6/2002 Roser et al.
2002/0086726 A1 7/2002 Ainsworth
2002/0094855 A1 7/2002 Berman
2002/0103018 A1 8/2002 Rommerdahl et al.
2002/0107072 A1 8/2002 Giobbi
2002/0123376 A1 9/2002 Walker et al.
2002/0132664 A1 9/2002 Miller et al.
2002/0142815 A1 10/2002 Candelore
2002/0142825 A1 10/2002 Lark et al.
2002/0143652 A1 10/2002 Beckett
2002/0147040 A1 10/2002 Walker et al.
2002/0147043 A1 10/2002 Shulman et al.
2002/0152120 A1 10/2002 Howington
2002/0167126 A1 11/2002 Herman De Raedt et al.
2002/0177480 A1 11/2002 Rowe
2002/0177483 A1 11/2002 Cannon
2002/0187834 A1 12/2002 Rowe et al.
2002/0193162 A1 12/2002 Walker et al.
2003/0003989 A1 1/2003 Johnson
2003/0013512 A1 1/2003 Rowe
2003/0017865 A1 1/2003 Beaulieu et al.
2003/0017867 A1 1/2003 deKeller
2003/0032474 A1 2/2003 Kaminkow
2003/0036425 A1 2/2003 Kaminkow et al.
2003/0054878 A1 3/2003 Benoy et al.
2003/0054881 A1 3/2003 Hedrick et al.
2003/0060276 A1 3/2003 Walker et al.
2003/0064769 A1 4/2003 Muir
2003/0064771 A1 4/2003 Morrow et al.

(56) References Cited

U.S. PATENT DOCUMENTS

| | | | |
|---|---|---|---|
| 2003/0067116 | A1 | 4/2003 | Colton |
| 2003/0078101 | A1 | 4/2003 | Schneider et al. |
| 2003/0083943 | A1 | 5/2003 | Adams et al. |
| 2003/0087685 | A1 | 5/2003 | Hogan et al. |
| 2003/0092484 | A1 | 5/2003 | Schneider et al. |
| 2003/0100360 | A1 | 5/2003 | Manfredi et al. |
| 2003/0114217 | A1 | 6/2003 | Walker et al. |
| 2003/0119575 | A1 | 6/2003 | Centuori et al. |
| 2003/0119576 | A1 | 6/2003 | McClintic et al. |
| 2003/0130042 | A1 | 7/2003 | Ollins |
| 2003/0135304 | A1 | 7/2003 | Sroub et al. |
| 2003/0137109 | A1 | 7/2003 | Vancura |
| 2003/0144048 | A1 | 7/2003 | Silva |
| 2003/0178774 | A1 | 9/2003 | Marcilio |
| 2003/0186733 | A1 | 10/2003 | Wolf et al. |
| 2003/0187736 | A1 | 10/2003 | Teague et al. |
| 2003/0190944 | A1 | 10/2003 | Manfredi et al. |
| 2003/0195029 | A1 | 10/2003 | Frohm et al. |
| 2003/0199292 | A1 | 10/2003 | Greenberg |
| 2003/0199295 | A1 | 10/2003 | Vancura |
| 2003/0199312 | A1 | 10/2003 | Walker et al. |
| 2003/0204474 | A1 | 10/2003 | Capek et al. |
| 2003/0207711 | A1 | 11/2003 | Rowe |
| 2003/0209853 | A1 | 11/2003 | Harris |
| 2003/0211884 | A1 | 11/2003 | Gauselmann |
| 2003/0216169 | A1 | 11/2003 | Walker et al. |
| 2003/0220138 | A1 | 11/2003 | Walker et al. |
| 2003/0220139 | A1 | 11/2003 | Peterson |
| 2003/0220143 | A1 | 11/2003 | Shteyn et al. |
| 2003/0228901 | A1 | 12/2003 | Walker et al. |
| 2003/0232640 | A1 | 12/2003 | Walker et al. |
| 2003/0234489 | A1 | 12/2003 | Okada |
| 2003/0236110 | A1 | 12/2003 | Beaulieu et al. |
| 2004/0002388 | A1 | 1/2004 | Larsen et al. |
| 2004/0009808 | A1 | 1/2004 | Gauselmann |
| 2004/0023715 | A1 | 2/2004 | Luciano et al. |
| 2004/0038735 | A1 | 2/2004 | Steil et al. |
| 2004/0038736 | A1 | 2/2004 | Bryant et al. |
| 2004/0048650 | A1 | 3/2004 | Mierau et al. |
| 2004/0048655 | A1 | 3/2004 | Yoshioka |
| 2004/0053657 | A1 | 3/2004 | Fiden et al. |
| 2004/0053681 | A1 | 3/2004 | Jordan et al. |
| 2004/0063484 | A1 | 4/2004 | Dreaper et al. |
| 2004/0072609 | A1 | 4/2004 | Ungaro et al. |
| 2004/0103013 | A1 | 5/2004 | Jameson |
| 2004/0121833 | A1 | 6/2004 | Mezen et al. |
| 2004/0142742 | A1 | 7/2004 | Schneider et al. |
| 2004/0158536 | A1 | 8/2004 | Kowal et al. |
| 2004/0166922 | A1 | 8/2004 | Michaelson et al. |
| 2004/0166940 | A1 | 8/2004 | Rothschild |
| 2004/0176156 | A1 | 9/2004 | Walker et al. |
| 2004/0180722 | A1 | 9/2004 | Giobbi |
| 2004/0198485 | A1 | 10/2004 | Loose et al. |
| 2004/0203611 | A1 | 10/2004 | Laporta et al. |
| 2004/0204213 | A1 | 10/2004 | Schugar et al. |
| 2004/0204216 | A1 | 10/2004 | Schugar |
| 2004/0204222 | A1 | 10/2004 | Roberts |
| 2004/0214637 | A1 | 10/2004 | Nonaka |
| 2004/0219967 | A1 | 11/2004 | Giobbi et al. |
| 2004/0224750 | A1 | 11/2004 | Al-Ziyoud |
| 2004/0229671 | A1 | 11/2004 | Stronach et al. |
| 2004/0229683 | A1 | 11/2004 | Mothwurf et al. |
| 2004/0229700 | A1 | 11/2004 | Cannon et al. |
| 2004/0235542 | A1 | 11/2004 | Stronach et al. |
| 2004/0248642 | A1 | 12/2004 | Rothschild |
| 2004/0254010 | A1 | 12/2004 | Fine |
| 2004/0266517 | A1 | 12/2004 | Bleich et al. |
| 2004/0266520 | A1 | 12/2004 | Aida |
| 2005/0014558 | A1 | 1/2005 | Estey |
| 2005/0026674 | A1 | 2/2005 | Wolf et al. |
| 2005/0043072 | A1 | 2/2005 | Nelson |
| 2005/0043088 | A1 | 2/2005 | Nguyen et al. |
| 2005/0043092 | A1 | 2/2005 | Gauselmann |
| 2005/0043094 | A1 | 2/2005 | Nguyen et al. |
| 2005/0049028 | A1 | 3/2005 | Gornez et al. |
| 2005/0054438 | A1 | 3/2005 | Rothschild et al. |
| 2005/0059467 | A1 | 3/2005 | Saffari et al. |
| 2005/0070356 | A1 | 3/2005 | Mothwurf et al. |
| 2005/0075164 | A1 | 4/2005 | Krynicky |
| 2005/0096121 | A1 | 5/2005 | Gilliland et al. |
| 2005/0096124 | A1 | 5/2005 | Stronach |
| 2005/0101375 | A1 | 5/2005 | Webb et al. |
| 2005/0101379 | A1 | 5/2005 | Falconer |
| 2005/0119052 | A1 | 6/2005 | Russell et al. |
| 2005/0124411 | A1 | 6/2005 | Schneider et al. |
| 2005/0124415 | A1 | 6/2005 | Centuori et al. |
| 2005/0148380 | A1 | 7/2005 | Cannon et al. |
| 2005/0148383 | A1 | 7/2005 | Mayeroff |
| 2005/0153773 | A1 | 7/2005 | Nguyen et al. |
| 2005/0164764 | A1 | 7/2005 | Ghaly |
| 2005/0181851 | A1 | 8/2005 | Amaitis et al. |
| 2005/0181856 | A1 | 8/2005 | Cannon et al. |
| 2005/0181860 | A1 | 8/2005 | Nguyen et al. |
| 2005/0181862 | A1 | 8/2005 | Asher et al. |
| 2005/0187014 | A1 | 8/2005 | Saffari et al. |
| 2005/0208995 | A1 | 9/2005 | Marshall et al. |
| 2005/0215311 | A1 | 9/2005 | Hornik et al. |
| 2005/0215314 | A1 | 9/2005 | Schneider et al. |
| 2005/0215316 | A1 | 9/2005 | Rowe et al. |
| 2005/0227760 | A1 | 10/2005 | Mazny et al. |
| 2005/0233794 | A1 | 10/2005 | Cannon et al. |
| 2005/0239541 | A1 | 10/2005 | Jorasch et al. |
| 2005/0239545 | A1 | 10/2005 | Rowe |
| 2005/0251440 | A1 | 11/2005 | Bednarek |
| 2005/0255902 | A1 | 11/2005 | Lind |
| 2005/0266905 | A1 | 12/2005 | Emori et al. |
| 2005/0282613 | A1 | 12/2005 | Pryzby et al. |
| 2006/0009284 | A1 | 1/2006 | Schwartz et al. |
| 2006/0025205 | A1 | 2/2006 | Casey et al. |
| 2006/0025206 | A1 | 2/2006 | Walker et al. |
| 2006/0025207 | A1 | 2/2006 | Walker et al. |
| 2006/0025210 | A1 | 2/2006 | Johnson |
| 2006/0030400 | A1 | 2/2006 | Mathis |
| 2006/0040723 | A1 | 2/2006 | Baerlocher et al. |
| 2006/0040730 | A1 | 2/2006 | Walker et al. |
| 2006/0046830 | A1 | 3/2006 | Webb |
| 2006/0046835 | A1 | 3/2006 | Walker et al. |
| 2006/0052153 | A1 | 3/2006 | Vlazny et al. |
| 2006/0052160 | A1 | 3/2006 | Saffari et al. |
| 2006/0058095 | A1 | 3/2006 | Berman et al. |
| 2006/0058097 | A1 | 3/2006 | Berman et al. |
| 2006/0068898 | A1 | 3/2006 | Maya |
| 2006/0068899 | A1 | 3/2006 | White et al. |
| 2006/0068903 | A1 | 3/2006 | Walker et al. |
| 2006/0073872 | A1 | 4/2006 | B-Jensen et al. |
| 2006/0073887 | A1 | 4/2006 | Nguyen et al. |
| 2006/0079310 | A1 | 4/2006 | Friedman et al. |
| 2006/0079314 | A1 | 4/2006 | Walker et al. |
| 2006/0084496 | A1 | 4/2006 | Jaffe et al. |
| 2006/0094493 | A1 | 5/2006 | Kido |
| 2006/0100009 | A1 | 5/2006 | Walker et al. |
| 2006/0105836 | A1 | 5/2006 | Walker et al. |
| 2006/0116201 | A1 | 6/2006 | Gauselmann |
| 2006/0121972 | A1 | 6/2006 | Walker et al. |
| 2006/0128467 | A1 | 6/2006 | Thomas |
| 2006/0135249 | A1 | 6/2006 | Seelig et al. |
| 2006/0148559 | A1 | 7/2006 | Jordan et al. |
| 2006/0149632 | A1 | 7/2006 | Register et al. |
| 2006/0154714 | A1 | 7/2006 | Montross et al. |
| 2006/0160598 | A1 | 7/2006 | Wells et al. |
| 2006/0160610 | A1 | 7/2006 | Potts |
| 2006/0174270 | A1 | 8/2006 | Westberg et al. |
| 2006/0183530 | A1 | 8/2006 | Ellis |
| 2006/0183536 | A1 | 8/2006 | Gagner et al. |
| 2006/0199631 | A1 | 9/2006 | McGill et al. |
| 2006/0205468 | A1 | 9/2006 | Saffari et al. |
| 2006/0211486 | A1 | 9/2006 | Walker et al. |
| 2006/0211496 | A1 | 9/2006 | Manz |
| 2006/0217175 | A1 | 9/2006 | Walker et al. |
| 2006/0229127 | A1 | 10/2006 | Walker et al. |
| 2006/0237905 | A1 | 10/2006 | Nicely et al. |
| 2006/0240890 | A1 | 10/2006 | Walker et al. |
| 2006/0247031 | A1 | 11/2006 | Walker et al. |
| 2006/0247034 | A1 | 11/2006 | Schneider et al. |

(56) References Cited

U.S. PATENT DOCUMENTS

| | | | |
|---|---|---|---|
| 2006/0247041 | A1 | 11/2006 | Walker et al. |
| 2006/0252509 | A1 | 11/2006 | Walker et al. |
| 2006/0252510 | A1 | 11/2006 | Walker et al. |
| 2006/0252512 | A1 | 11/2006 | Walker et al. |
| 2006/0252519 | A1 | 11/2006 | Walker et al. |
| 2006/0258422 | A1 | 11/2006 | Walker et al. |
| 2006/0258425 | A1 | 11/2006 | Edidin et al. |
| 2006/0258432 | A1 | 11/2006 | Packer et al. |
| 2006/0287034 | A1 | 12/2006 | Englman et al. |
| 2006/0287045 | A1 | 12/2006 | Walker et al. |
| 2006/0287075 | A1 | 12/2006 | Walker et al. |
| 2006/0287098 | A1 | 12/2006 | Morrow et al. |
| 2006/0287102 | A1 | 12/2006 | White et al. |
| 2007/0001396 | A1 | 1/2007 | Walker et al. |
| 2007/0010309 | A1 | 1/2007 | Giobbi et al. |
| 2007/0010315 | A1 | 1/2007 | Hein |
| 2007/0015564 | A1 | 1/2007 | Walker et al. |
| 2007/0021202 | A1 | 1/2007 | Matsumoto |
| 2007/0049369 | A1 | 3/2007 | Kuhn et al. |
| 2007/0050256 | A1 | 3/2007 | Walker et al. |
| 2007/0060252 | A1 | 3/2007 | Taylor |
| 2007/0060254 | A1 | 3/2007 | Muir |
| 2007/0060274 | A1 | 3/2007 | Rowe et al. |
| 2007/0060295 | A1 | 3/2007 | DeMar et al. |
| 2007/0060323 | A1 | 3/2007 | Isaac et al. |
| 2007/0060334 | A1 | 3/2007 | Rowe |
| 2007/0060387 | A1 | 3/2007 | Enzminger et al. |
| 2007/0066377 | A1 | 3/2007 | Van Asdale |
| 2007/0087822 | A1 | 4/2007 | Van Luchene |
| 2007/0105612 | A1 | 5/2007 | Fotevski |
| 2007/0105615 | A1 | 5/2007 | Lind |
| 2007/0105618 | A1 | 5/2007 | Steil |
| 2007/0106553 | A1 | 5/2007 | Jordan et al. |
| 2007/0111772 | A1 | 5/2007 | Shuster et al. |
| 2007/0111776 | A1 | 5/2007 | Griswold et al. |
| 2007/0112609 | A1 | 5/2007 | Howard et al. |
| 2007/0117619 | A1 | 5/2007 | Walker et al. |
| 2007/0117623 | A1 | 5/2007 | Nelson et al. |
| 2007/0129147 | A1 | 6/2007 | Gagner |
| 2007/0135214 | A1 | 6/2007 | Walker et al. |
| 2007/0143156 | A1 | 6/2007 | van Deursen |
| 2007/0167210 | A1 | 7/2007 | Kelly et al. |
| 2007/0180371 | A1 | 8/2007 | Kammler |
| 2007/0184896 | A1 | 8/2007 | Dickerson |
| 2007/0191087 | A1 | 8/2007 | Thomas et al. |
| 2007/0197247 | A1 | 8/2007 | Inselberg |
| 2007/0205556 | A1 | 9/2007 | Roemer et al. |
| 2007/0218974 | A1 | 9/2007 | Patel et al. |
| 2007/0254732 | A1 | 11/2007 | Walker et al. |
| 2007/0259709 | A1 | 11/2007 | Kelly et al. |
| 2007/0275777 | A1 | 11/2007 | Walker et al. |
| 2007/0281775 | A1 | 12/2007 | Kashima |
| 2007/0293292 | A1 | 12/2007 | Gipp et al. |
| 2007/0298874 | A1 | 12/2007 | Baerlocher et al. |
| 2008/0004101 | A1 | 1/2008 | Hein et al. |
| 2008/0015004 | A1 | 1/2008 | Gatto et al. |
| 2008/0026826 | A1 | 1/2008 | Groswirt |
| 2008/0039190 | A1 | 2/2008 | Walker et al. |
| 2008/0058105 | A1 | 3/2008 | Combs et al. |
| 2008/0064495 | A1 | 3/2008 | Bryant et al. |
| 2008/0070695 | A1 | 3/2008 | Baerlocher et al. |
| 2008/0076576 | A1 | 3/2008 | Graham et al. |
| 2008/0090651 | A1 | 4/2008 | Baerlocher |
| 2008/0096632 | A1 | 4/2008 | Okada |
| 2008/0096636 | A1 | 4/2008 | Power |
| 2008/0102921 | A1 | 5/2008 | Urquhart |
| 2008/0102935 | A1 | 5/2008 | Finnimore |
| 2008/0102946 | A1 | 5/2008 | Amour |
| 2008/0108401 | A1 | 5/2008 | Baerlocher et al. |
| 2008/0113749 | A1 | 5/2008 | Williams et al. |
| 2008/0113777 | A1 | 5/2008 | Anderson |
| 2008/0113779 | A1 | 5/2008 | Cregan |
| 2008/0113811 | A1 | 5/2008 | Linard et al. |
| 2008/0119260 | A1 | 5/2008 | Nores |
| 2008/0132320 | A1 | 6/2008 | Rodgers |
| 2008/0132328 | A1 | 6/2008 | Yoshioka |
| 2008/0139274 | A1 | 6/2008 | Baerlocher |
| 2008/0139305 | A1 | 6/2008 | Vallejo et al. |
| 2008/0146331 | A1 | 6/2008 | Nordman et al. |
| 2008/0146344 | A1 | 6/2008 | Rowe et al. |
| 2008/0153564 | A1 | 6/2008 | Baerlocher et al. |
| 2008/0153580 | A1 | 6/2008 | Beadell et al. |
| 2008/0161085 | A1 | 7/2008 | Hansen |
| 2008/0161099 | A1 | 7/2008 | Sines et al. |
| 2008/0171586 | A1 | 7/2008 | Roemer |
| 2008/0176647 | A1 | 7/2008 | Acres |
| 2008/0182655 | A1 | 7/2008 | DeWaal et al. |
| 2008/0207313 | A1 | 8/2008 | Acres |
| 2008/0214286 | A1 | 9/2008 | Lutnick et al. |
| 2008/0220852 | A1 | 9/2008 | Olive |
| 2008/0220861 | A1 | 9/2008 | Okada |
| 2008/0234035 | A1 | 9/2008 | Malek |
| 2008/0242394 | A1 | 10/2008 | Sakuma |
| 2008/0242398 | A1 | 10/2008 | Harris et al. |
| 2008/0248851 | A1 | 10/2008 | Bloom |
| 2008/0254886 | A1 | 10/2008 | Kelly |
| 2008/0261699 | A1 | 10/2008 | Topham et al. |
| 2008/0268959 | A1 | 10/2008 | Bryson et al. |
| 2008/0280674 | A1 | 11/2008 | Sakuma |
| 2008/0287186 | A1 | 11/2008 | Sakuma |
| 2008/0293467 | A1 | 11/2008 | Mathis |
| 2008/0318656 | A1 | 12/2008 | Walker et al. |
| 2008/0318686 | A1 | 12/2008 | Crowder et al. |
| 2009/0005170 | A9 | 1/2009 | Kelly et al. |
| 2009/0036202 | A1 | 2/2009 | Baerlocher et al. |
| 2009/0042652 | A1 | 2/2009 | Baerlocher et al. |
| 2009/0048012 | A1 | 2/2009 | Patel et al. |
| 2009/0070081 | A1 | 3/2009 | Saenz et al. |
| 2009/0075712 | A1 | 3/2009 | Englman et al. |
| 2009/0075728 | A1 | 3/2009 | Acres |
| 2009/0088239 | A1 | 4/2009 | Iddings et al. |
| 2009/0117981 | A1 | 5/2009 | Yoshizawa |
| 2009/0124327 | A1 | 5/2009 | Caputo et al. |
| 2009/0124364 | A1 | 5/2009 | Cuddy et al. |
| 2009/0131134 | A1 | 5/2009 | Baerlocher et al. |
| 2009/0131175 | A1 | 5/2009 | Kelly et al. |
| 2009/0137312 | A1 | 5/2009 | Walker et al. |
| 2009/0170608 | A1 | 7/2009 | Herrmann et al. |
| 2009/0176580 | A1 | 7/2009 | Herrmann et al. |
| 2009/0189351 | A1 | 7/2009 | Baerlocher et al. |
| 2009/0233682 | A1 | 9/2009 | Kato et al. |
| 2009/0239601 | A1 | 9/2009 | Macke |
| 2009/0239622 | A1 | 9/2009 | Fujimori et al. |
| 2009/0239628 | A1 | 9/2009 | Fujimori et al. |
| 2009/0247284 | A1 | 10/2009 | Sugiyama et al. |
| 2009/0253477 | A1 | 10/2009 | Teranishi |
| 2009/0253478 | A1 | 10/2009 | Walker et al. |
| 2009/0253490 | A1 | 10/2009 | Teranishi |
| 2009/0270168 | A1 | 10/2009 | Englman et al. |
| 2009/0275389 | A1 | 11/2009 | Englman et al. |
| 2009/0286590 | A1 | 11/2009 | Bennett |
| 2009/0325669 | A1 | 12/2009 | Kelly et al. |
| 2009/0325670 | A1 | 12/2009 | Kelly et al. |
| 2010/0016055 | A1 | 1/2010 | Englman |
| 2010/0019738 | A1 | 1/2010 | Basic et al. |
| 2010/0041464 | A1 | 2/2010 | Arezina et al. |
| 2010/0048286 | A1 | 2/2010 | Okada et al. |
| 2010/0056241 | A1 | 3/2010 | Acres |
| 2010/0056248 | A1 | 3/2010 | Acres |
| 2010/0075741 | A1 | 3/2010 | Aoki et al. |
| 2010/0105454 | A1 | 4/2010 | Weber et al. |
| 2010/0105466 | A1 | 4/2010 | Inamura et al. |
| 2010/0113130 | A1 | 5/2010 | Kamano et al. |
| 2010/0124981 | A1 | 5/2010 | Kato et al. |
| 2010/0130280 | A1 | 5/2010 | Arezina et al. |
| 2010/0197384 | A1 | 8/2010 | Wright et al. |
| 2010/0197389 | A1 | 8/2010 | Ueda |
| 2010/0234089 | A1 | 9/2010 | Saffari et al. |
| 2010/0285867 | A1 | 11/2010 | Okada |
| 2010/0304834 | A1 | 12/2010 | Okada |
| 2011/0021259 | A1 | 1/2011 | Acres |
| 2011/0039615 | A1 | 2/2011 | Acres et al. |
| 2011/0053675 | A1 | 3/2011 | Aoki et al. |
| 2011/0081958 | A1 | 4/2011 | Herrmann et al. |

(56) References Cited

U.S. PATENT DOCUMENTS

| | | | | |
|---|---|---|---|---|
| 2011/0081964 | A1 | 4/2011 | Acres | |
| 2011/0111836 | A1 | 5/2011 | Acres | |
| 2011/0117987 | A1 | 5/2011 | Aoki et al. | |
| 2011/0165938 | A1 | 7/2011 | Anderson et al. | |
| 2011/0183753 | A1 | 7/2011 | Acres et al. | |
| 2011/0218030 | A1 | 9/2011 | Acres | |
| 2011/0223983 | A1 | 9/2011 | Schwartz et al. | |
| 2011/0275438 | A9 | 11/2011 | Hardy et al. | |
| 2011/0281632 | A1 | 11/2011 | Okada | |
| 2011/0287826 | A1 | 11/2011 | Kato et al. | |
| 2011/0294563 | A1 | 12/2011 | Jaffe | |
| 2012/0077565 | A1 | 3/2012 | Barbalet | |
| 2012/0115566 | A1 | 5/2012 | Fujisawa et al. | |
| 2012/0172108 | A1 | 7/2012 | Acres | |
| 2012/0172130 | A1 | 7/2012 | Acres | |
| 2012/0190425 | A1 | 7/2012 | Barbalet | |
| 2012/0190426 | A1 | 7/2012 | Acres | |
| 2013/0331172 | A1 | 12/2013 | Olsen | |
| 2013/0331967 | A1 | 12/2013 | Amaitis et al. | |
| 2014/0080565 | A1 | 3/2014 | Pececnik | |
| 2014/0094256 | A1 | 4/2014 | Hilbert et al. | |
| 2014/0106858 | A1 | 4/2014 | Constable et al. | |
| 2014/0148230 | A1 | 5/2014 | Guase et al. | |
| 2016/0117883 | A1* | 4/2016 | Berman | G07F 17/326 463/20 |
| 2016/0117887 | A1* | 4/2016 | Berman | G07F 17/326 463/16 |
| 2017/0011584 | A1 | 1/2017 | Acres | |
| 2017/0032627 | A1 | 2/2017 | Acres | |
| 2017/0228961 | A1 | 8/2017 | Acres | |
| 2018/0151031 | A1 | 5/2018 | Acres | |
| 2018/0158273 | A1 | 6/2018 | Acres | |
| 2018/0211492 | A1 | 7/2018 | Acres | |
| 2018/0330572 | A1* | 11/2018 | Berman | G07F 17/326 |
| 2019/0295356 | A1 | 9/2019 | Acres | |
| 2020/0013262 | A1 | 1/2020 | Acres | |
| 2020/0051400 | A1 | 2/2020 | Acres | |
| 2020/0302741 | A1 | 9/2020 | Acres | |
| 2021/0056802 | A1 | 2/2021 | Acres | |
| 2021/0280013 | A1* | 9/2021 | Davis | G07F 17/3267 |
| 2023/0101859 | A1* | 3/2023 | Ludwick | G06F 7/588 463/25 |

FOREIGN PATENT DOCUMENTS

| | | | |
|---|---|---|---|
| EP | 896304 | A3 | 8/2000 |
| EP | 919965 | A3 | 8/2000 |
| EP | 1091789 | A1 | 4/2001 |
| EP | 981397 | A4 | 1/2002 |
| EP | 1170041 | A2 | 1/2002 |
| EP | 1231577 | A3 | 1/2003 |
| EP | 896308 | B1 | 10/2003 |
| EP | 1369830 | A1 | 12/2003 |
| EP | 1351180 | A3 | 2/2004 |
| EP | 1490849 | A2 | 12/2004 |
| EP | 1637196 | B1 | 11/2006 |
| EP | 1832952 | A3 | 9/2007 |
| EP | 1938872 | A2 | 7/2008 |
| EP | 1623375 | A4 | 10/2010 |
| EP | 1496419 | B1 | 3/2013 |
| JP | 2-21883 | | 1/1990 |
| WO | 95/21665 | A1 | 8/1995 |
| WO | 95/31262 | A3 | 1/1996 |
| WO | 96/35490 | A1 | 11/1996 |
| WO | 97/46293 | A1 | 12/1997 |
| WO | 00/32286 | A1 | 6/2000 |
| WO | 00/17825 | A3 | 10/2000 |
| WO | 00/64545 | A8 | 7/2001 |
| WO | 01/59680 | A1 | 8/2001 |
| WO | 01/36059 | A8 | 9/2001 |
| WO | 01/80961 | A1 | 11/2001 |
| WO | 03/066179 | A2 | 8/2003 |
| WO | 03/089092 | A1 | 10/2003 |
| WO | 2005029279 | A3 | 6/2005 |
| WO | 2005/099845 | A1 | 10/2005 |
| WO | 2005099841 | A1 | 10/2005 |
| WO | 2005/113093 | A1 | 12/2005 |
| WO | 2006/032498 | A1 | 3/2006 |
| WO | 2006/014770 | A3 | 4/2006 |
| WO | 2006/014990 | A3 | 4/2006 |
| WO | 2006/060493 | A9 | 7/2006 |
| WO | 2006104731 | A2 | 10/2006 |
| WO | 2006121663 | A2 | 11/2006 |
| WO | 2006/014745 | A3 | 12/2006 |
| WO | 2006135608 | A2 | 12/2006 |
| WO | 2006/060442 | A3 | 2/2007 |
| WO | 2006/055518 | A3 | 3/2007 |
| WO | 2006/036948 | A3 | 6/2007 |
| WO | 2005029287 | A3 | 7/2007 |
| WO | 2007/087286 | A3 | 1/2008 |
| WO | 2008/024556 | A2 | 2/2008 |
| WO | 2008024705 | A2 | 2/2008 |
| WO | 2008027429 | A2 | 3/2008 |

OTHER PUBLICATIONS

Acres, John: "The Future of Gaming, Where Will You be in 10 Years?", Slot Operations Management/Casino Enterprise Management, Jul. 2007, pp. 8-10, 12.

White Paper: An Analysis of Harrah's Total Rewards Players Rewards Program written and published by Gaming Market Advisor on or before Dec. 31, 2006, retrieved from URL <http://www.gamingmarketadvisors.com/publications/Harrahs%20Total%20Rewards%20White%20Paper.pdf>, 41 pages.

Acres, John, An Ingenious Internet Marketing Tool, Slot Operations Management / Casino Enterprise Management, Aug. 2007, pp. 8-10.

* cited by examiner

GAMING DEVICE HAVING MULTIPLE GAME PLAY OPTION

CROSS REFERENCE TO RELATED PATENT APPLICATIONS

This application is a continuation of U.S. Non-Provisional application Ser. No. 17/317,182, filed May 11, 2021, which is a continuation of U.S. Non-Provisional application Ser. No. 16/572,839, filed Sep. 17, 2019, now U.S. Pat. No. 11,024,132, issued Jun. 1, 2021, which is a continuation of U.S. Non-Provisional application Ser. No. 15/878,086 filed Jan. 23, 2018, now U.S. Pat. No. 10,445,988, issued Oct. 15, 2019, which is a continuation of U.S. Non-Provisional application Ser. No. 15/289,348, filed Oct. 10, 2016, now U.S. Pat. No. 9,911,288 issued Mar. 6, 2018, which is a continuation of U.S. Non-Provisional application Ser. No. 14/982,879, filed Dec. 29, 2015, now U.S. Pat. No. 9,483, 909, issued Nov. 1, 2016, which is a continuation application of U.S. Non-Provisional application Ser. No. 14/195,280, filed Mar. 3, 2014, now U.S. Pat. No. 9,251,671, issued on Feb. 2, 2016, which is a continuation application of U.S. Non-Provisional application Ser. No. 12/509,319, filed Jul. 24, 2009, now U.S. Pat. No. 8,702,490, issued on Apr. 22, 2014, the contents of which are hereby incorporated by reference herein for all purposes.

FIELD OF THE INVENTION

This disclosure relates generally to gaming devices, and more particularly to gaming devices configured to initiate multiple gaming events in response to a player input, as well as methods of operating gaming devices to initiate multiple gaming events.

BACKGROUND

In general, players gamble by placing a wager on a gaming event at a gaming device and make some input to initiate the gaming event. For example, on a typical spinning reel slot machine, a player may place a wager of a dollar and pull a game handle to spin the reels of the gaming device. When the reels come to rest, any awards associated with symbols shown the reels in conjunction with a displayed payline are paid. Then the player repeats the above process to play another gaming event. Some gaming devices include special initiation buttons, such as a "Max Bet" button that places a maximum wager and initiates the gaming event based on the same player action of pressing the "Max Bet" button. Even in this scenario, however, the player must still take an action to initiate subsequent gaming events.

Some slot machines also include "free spins" bonuses. After these bonuses are triggered, the player typically receives a predetermined number of "free spins" as a bonus prize. Any awards received during the bonus spins are accumulated and paid out as a bonus win at the end of the free spins. For example, if a bonus awards a player 10 free spins, an indication is displayed to alert the player of the bonus award and the first free spin initiates. When the first free spin concludes, the amounts won, if any, are rolled up in a bonus win meter, and the second free spin automatically begins. This process continues until all of the free spins have been played. At this point the total value of the bonus win meter is added to the player's credit meter. Many variations of this bonus exist. Oftentimes the game display changes color, theme, and sound to signify that the free spins are awarded coming as part of a bonus. Additionally, the reels and pays often change to promote additional wins during the bonus free spins. In each case, however, the bonus itself must be triggered and typically results from a single wager being placed on the gaming device. One common triggering event is a certain symbol combination appearing on the game's display as a result of game on which the player has wagered.

DETAILED DESCRIPTION

Figure 1A:
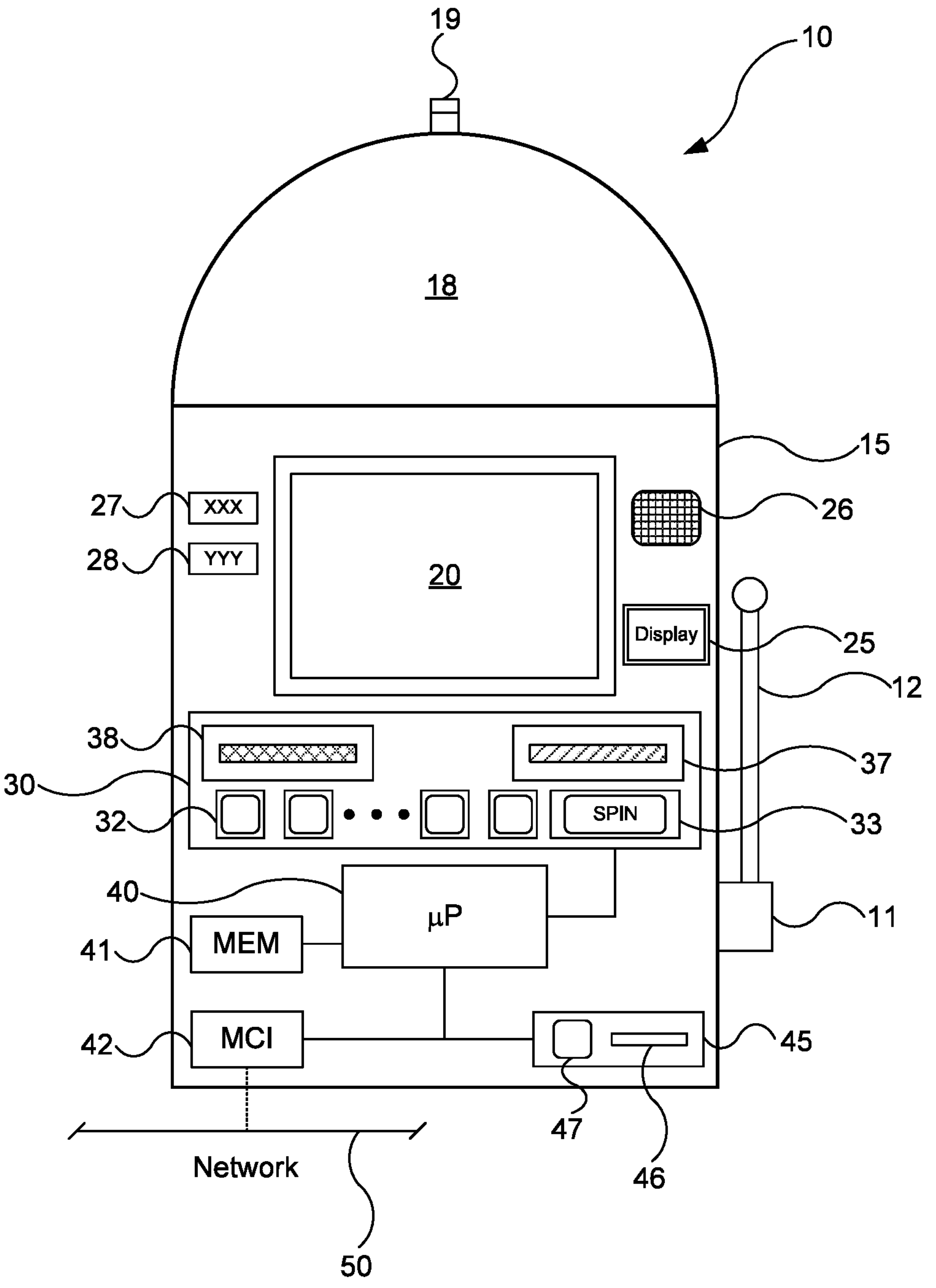
FIG. 1A is a functional block diagram that illustrates a gaming device according to embodiments of the invention.
Figure 1B:
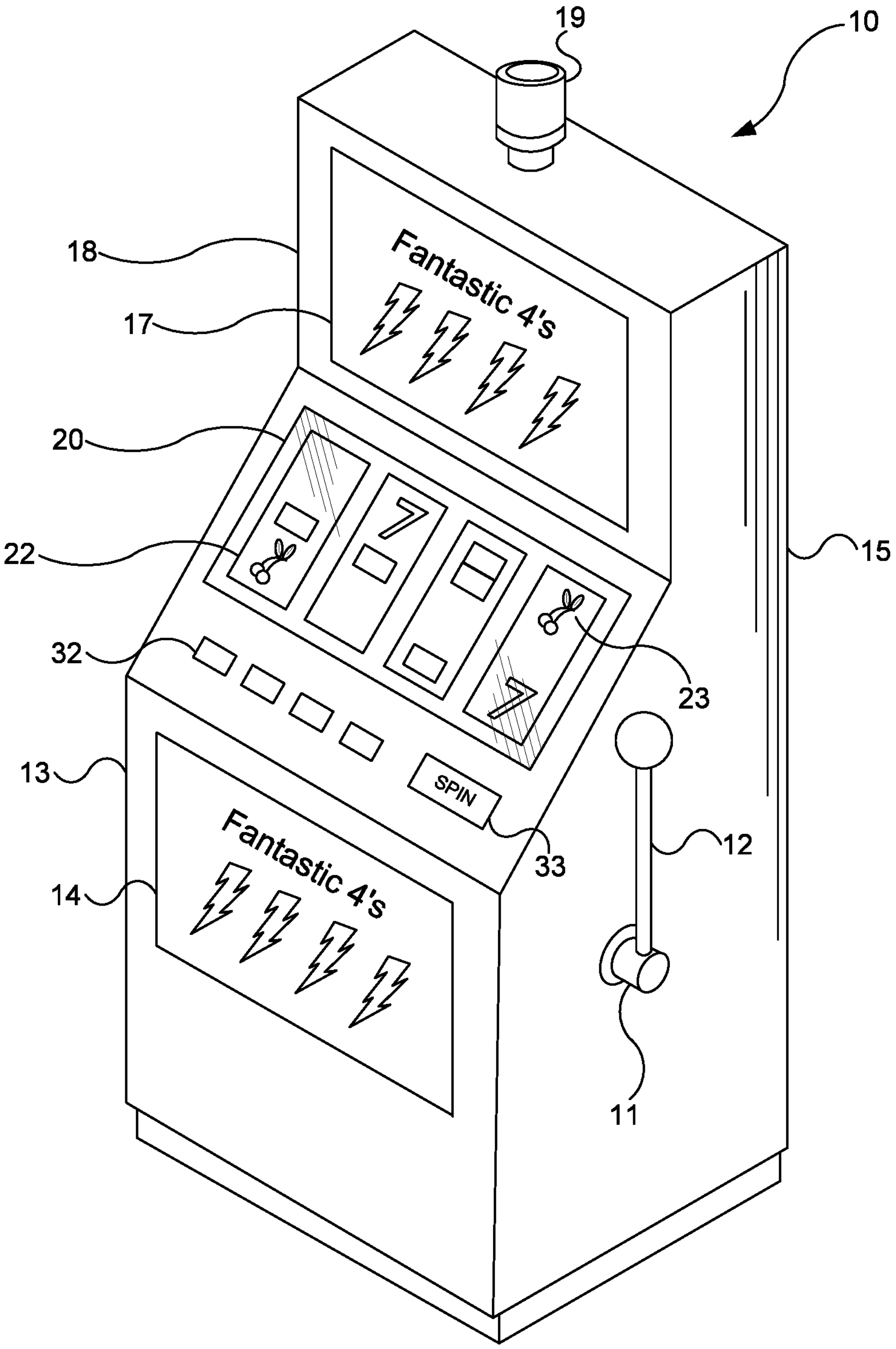
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cash-out.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window". Another example is Las Vegas Gaming Incorporated's retrofit technology which allows information to be placed over areas of the game or the secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicating with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

During typical play on a gaming device 10, a player plays a game by placing a wager and then initiating a gaming session. The player may initially insert monetary bills or previously printed tickets with a credit value into the bill acceptor 37. The player may also put coins into a coin acceptor (not shown) or a credit, debit or casino account card into a card reader/authorizer (not shown). In other embodiments, stored player points or special 'bonus points' awarded to the player or accumulated and/or stored in a player account may be able to be substituted at or transferred to the gaming device 10 for credits or other value. For example, a player may convert stored loyalty points to credits or transfer funds from his bank account, credit card, casino account or other source of funding. The selected source of funding may be selected by the player at time of transfer, determined by the casino at the time of transfer or occur automatically according to a predefined selection process. One of skill in the art will readily see that this invention is useful with all gambling devices, regardless of the manner in which wager value-input is accomplished.

The credit meter 27 displays the numeric credit value of the money or other value inserted, transferred, or stored dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The gaming session may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a gaming session.

If the gaming session does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
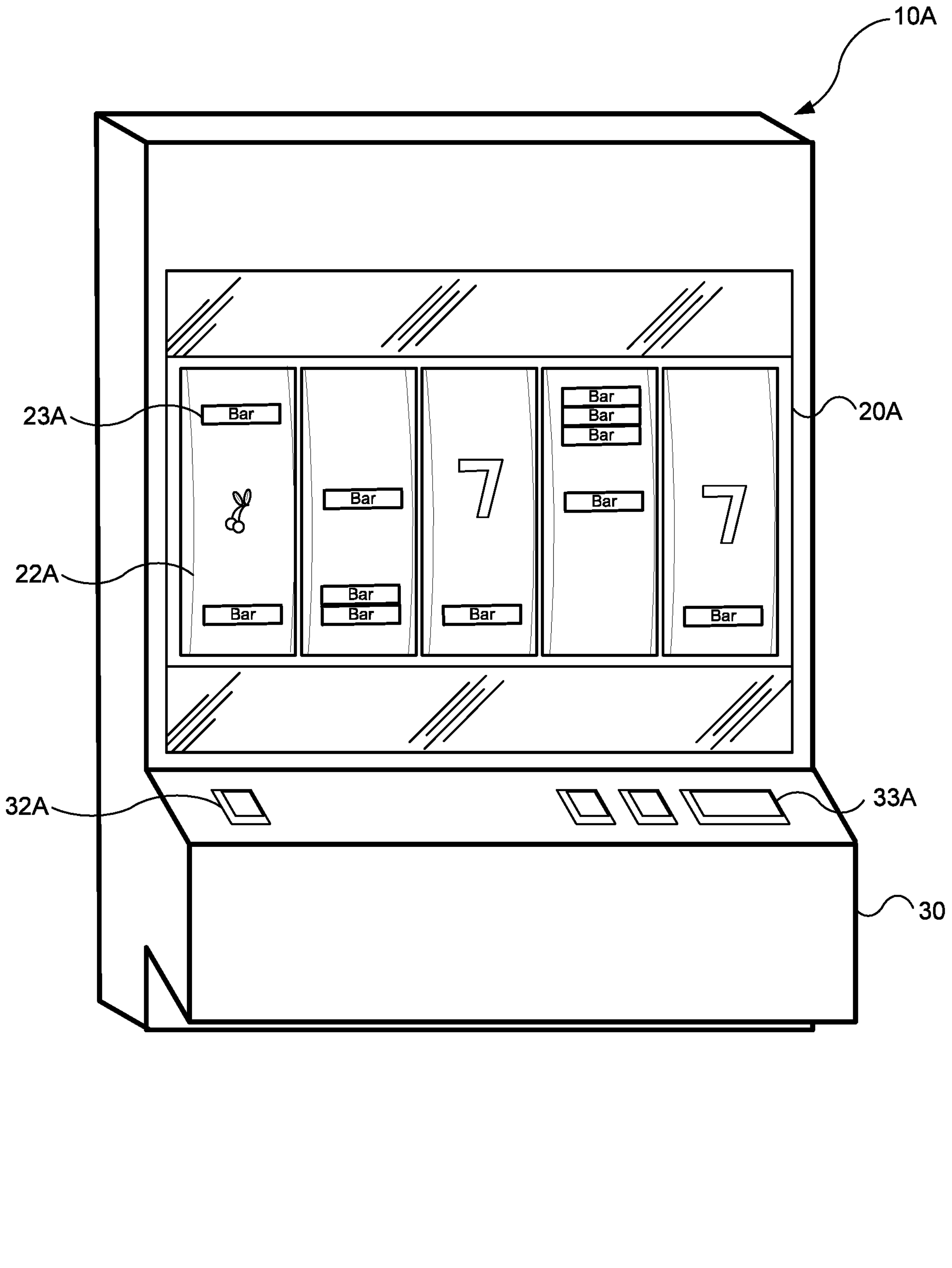
FIGS. 2A, 2B, and 2C are detail diagrams of exemplary types of gaming devices according to embodiments of the invention.
Figure 2B:
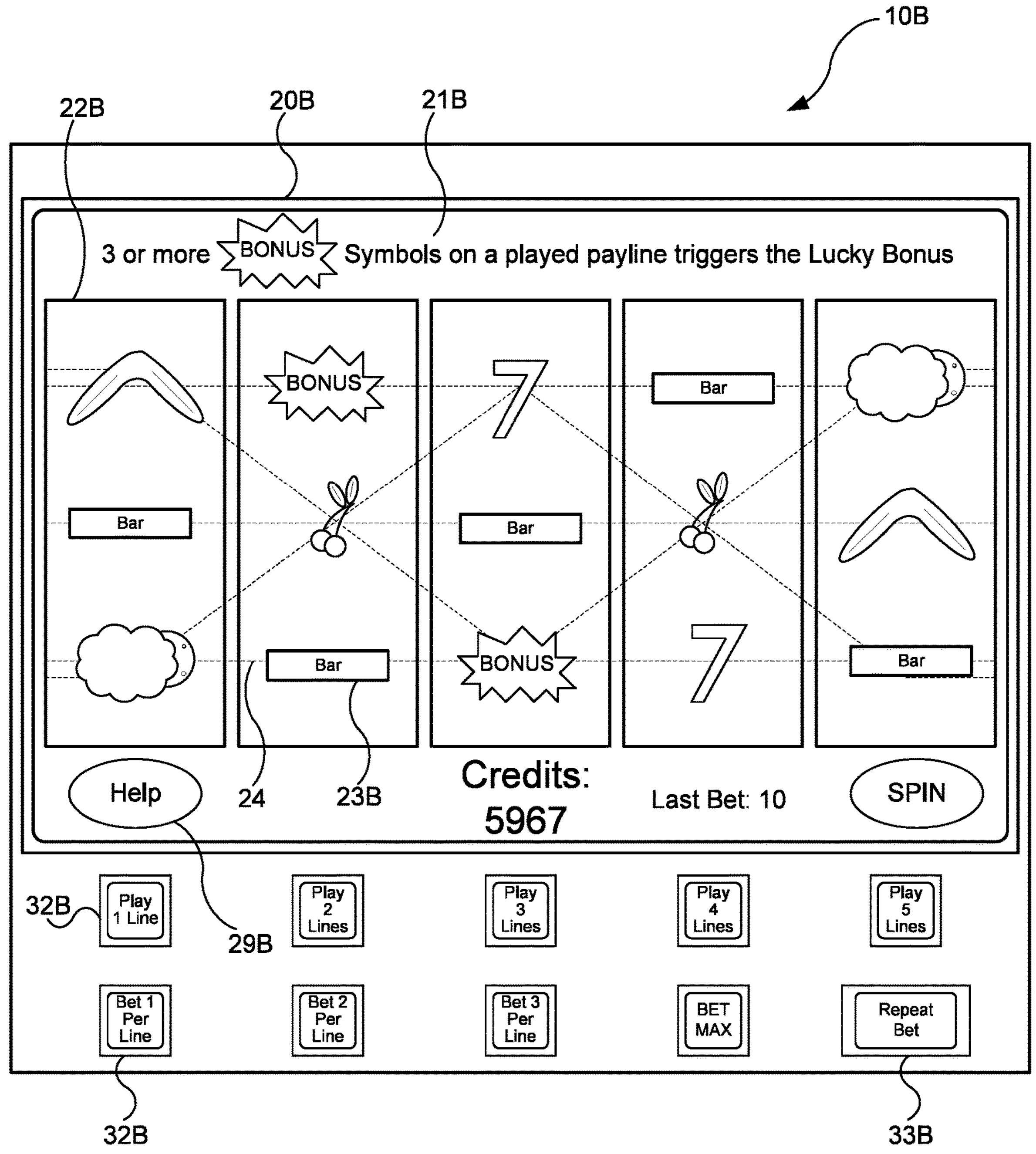
Figure 2C:
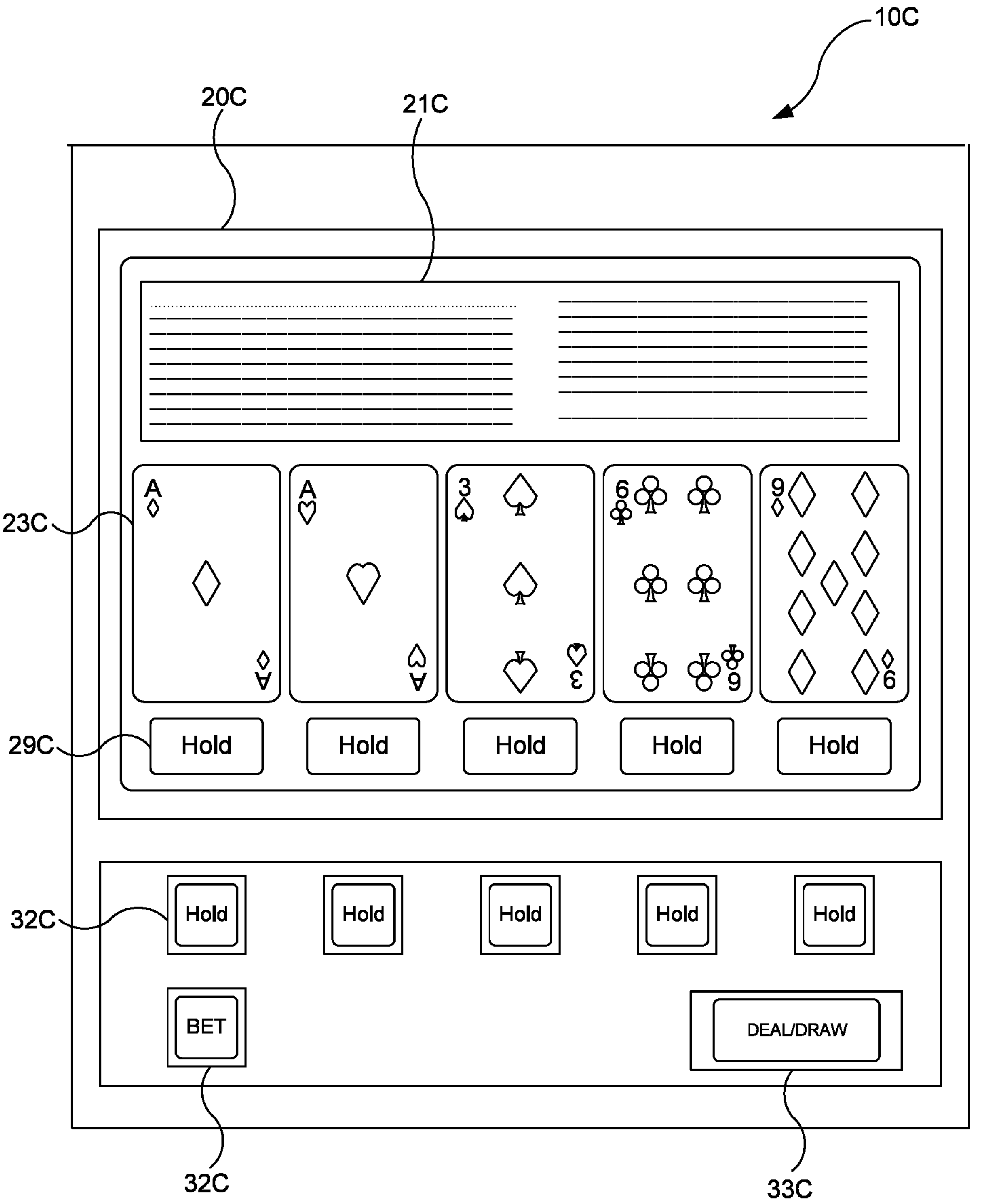

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A gaming session on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touch screen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the gaming sessions. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the gaming session ends. However, since the player typically must wager at least a minimum number of credits to enable each payline 24 to be eligible for winning, the overall odds of winning are not much different, if at all, than if the player is wagering only on a single payline. For example, in a five line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five gaming sessions, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a gaming session. A repeat bet or spin button 33B may also be used to initiate each gaming session when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a pay table for various winning hands, as well as a plurality of player selectable soft buttons 29C. The video display 20C may present a poker hand of five cards 23C and various other player information 21C including a number of player selectable soft (touch-screen) buttons 29C and a pay table for various winning hands. Although the embodiment illustrated in FIG. 3C shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a gaming session after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines and various other types of gaming devices known in the art are contemplated and are within the scope of the invention.

Figure 3:
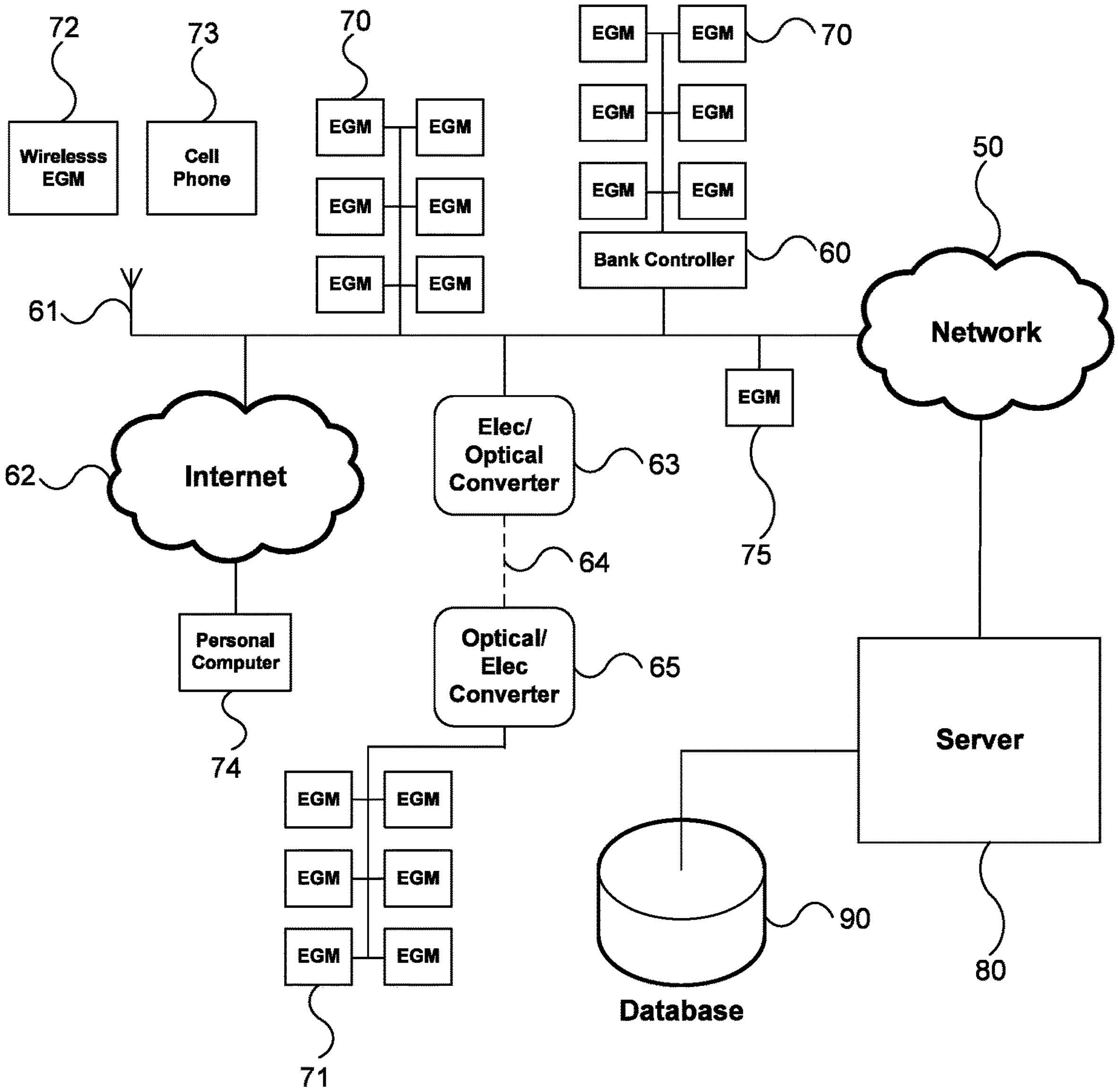
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3, substantially the entire network 50 may be made of fiber optic lines or may be a wireless network utilizing a wireless protocol such as IEEE 802.11a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records in the player database 90 to provide the player with information regarding their player account or other features at the gaming device 10 where the player is wagering. Additionally, multiple databases 90 and/or servers 80 may be present and coupled to one or more networks 50 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

Figure 4:
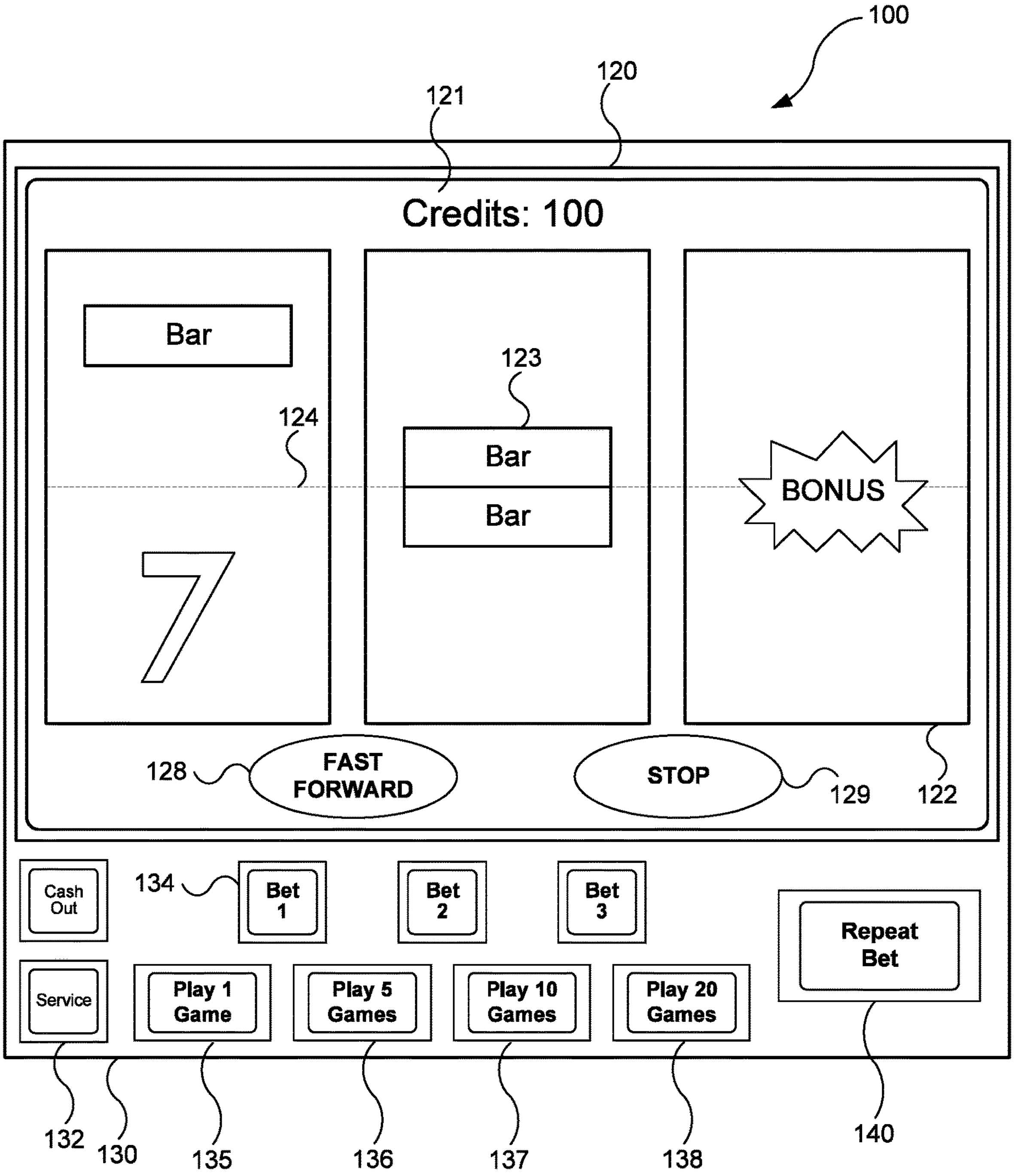
FIG. 4 is a detail diagram of a gaming device according to embodiments of the invention.

FIG. 4 is a detail diagram of a gaming device according to embodiments of the invention.

Referring to FIG. 4, a gaming device 100 includes similar features to the gaming devices described above. However, unlike above described gaming devices, the illustrated gaming device 100 includes a group of buttons each of which allows the player to play multiple games without further interaction form the player. In other words, the player may initiate a set of games (gaming events) by activating one of these multiple play buttons. Each individual game of the set includes an automatically placed wager and a game result. Included in the group of multiple play buttons shown on the illustrated game device 100 is a “Play 5 Games” button 136, a “Play 10 Games” button 137 and a “Play 20 Games” button 138. In addition to these multiple play buttons 136-138, the gaming device 100 also includes a “Play 1 Game” button 135, which may be configured in a similar manner to a typical “Spin” button on a gaming device that initiates a single game on the gaming device 100.

In operation, pressing any of these buttons 135-138 automatically plays a predetermined number of games on the gaming device 100 without further input from the player. In this example, the number of predetermined games is prelabeled on the game initiation buttons 135-138. For example, if the player presses the “Play 10 Games” button 137, then a set of 10 games is initiated on the gaming device 100, where the gaming device automatically initiates and plays 10 games in sequence without requiring further button presses from the player. For each of the games, a credit meter 121 is debited the appropriate wager amount and a set of reels 122 spins on the gaming device and eventually comes to a stop to display a game result. If the game result includes a winning combination of symbols 123 on a payline 124, then the gaming device 100 awards a number the credits associated with the winning combination of symbols 123 by rolling the credits won to the credit meter 121, after which point the game is completed. On the other hand, if the game result does not include a winning symbol combination along the payline 124 (a losing outcome), for instance, one like the game result illustrated in FIG. 4, then no credits are awarded and no further action is taken with respect to the now completed game.

With conventional gaming devices, after a game has been completed (with either a winning or losing game result), the gaming device will generally not take any action until it receives a subsequent player input, such as an input to initiate another game, an input to cash-out, etc. In the above example of a player pressing the “Play 10 Games” button 137, the completion of the first game of the 10 game set does not place the gaming device 100 in an idle mode waiting for another player input. Rather, the gaming device automatically initiates another game in the set, deducts a credit wager amount from the credit meter 121, spins the reels 122, displays a game result, and pays any awards associated with the game result. This sequence of events is repeated for each of the 10 games in the 10 game set. After the completion of the tenth game, the gaming device may transfer to an idle mode where it waits for another player interaction. Thus, in this exemplary embodiment, pressing the “Play 10 Games” button 137 is substantially equivalent to the player pressing a standard play or spin button, described above, ten separate times.

In addition to the game play buttons 135-138, a player interface panel 130 includes wager buttons 134. In the particular example illustrated in FIG. 4, there are three wager buttons 134 associated with three wagers that a player can place on each game: a one credit wager per game, a two credit wager per game, and a three credit wager per game. The “Bet 1” button, “Bet 2” button, and “Bet 3” button respectively correspond to these wager amounts. That is, selecting one of the wager buttons 134 causes the particular wager associated with the wager button 134 to be used in each of the games selected by the multiple play buttons 135-138. For example, if the player presses the “Bet 3” wager button 134 and then presses the “Play 5 Games” button 136, a three credit wager will be placed for each of the five games specified by the multiple play button 136. Thus, the player will be placing a total wager of 15 credits for the set of five games. If instead, the player had pressed the “Bet 1” wager button 134 and then pressed the “Play 5 Games” button 136, then the player would be wagering only one credit for each of the five games automatically played, or wagering a total of five credits.

A “Repeat Bet” button 140 and one or more game buttons 132 are also included on the player interface panel 130. The game buttons 132 may have similar functions to the ones described above, such as requesting help from a casino attendant or cashing out the credits shown on the credit meter 121. The “Repeat Bet” button 140 has the function of repeating a previous wager and game initiation sequence. In the present embodiment, the “Repeat Bet” button 140 may also be used to repeat a multiple game set at a particular wager. For example, if the previous set of games included ten games, each at a wager of 2, then pressing the “Repeat Bet” button 140 would cause the gaming device 100 to automatically play ten more games, each of which had a wager of 2 credits. In some embodiments, the selected wager button 134 and previously selected game play button 135-138 may be highlighted, so that the player will know the effect of pressing the repeat bet button 140. In other embodiments, all of the wager buttons 134 and game play buttons 135-138 may be highlighted to show that all of these buttons are active for a player to press.

As discussed above, the number of credits shown on the credit meter 121 indicates the total number of credits available to the player to be played on the gaming device 100. During typical game operation, the credits wagered are simply deducted from the credits shown on the credit meter 121 for game play. If not enough credits remain on the credit meter 121 to cover a wager, the gaming device 100 typically disables the wager buttons 134 and game player buttons 135-138 corresponding to wagers that cannot be made. In addition, the “Repeat Bet” button 140, may be disabled if the remaining credits on the credit meter 121 are not sufficient to cover a previous wager. With multiple game sets, the gaming device 100 can accommodate situations where enough credits remain to play some but not all of the games of a multiple game set by using several different options.

In one option, the gaming device 100 does not play the requested games, but rather indicates to the player that there are insufficient credits to cover the player’s request. This may include disabling some of the wager buttons 134 and game player buttons 135-138 as discussed above. In addition, the credit meter 121 could flash in such a situation to bring to the player’s attention that a low number of credits remain on the credit meter 121. In a second option, the gaming device 100 may wager and play as many of the requested games as possible before the number of credits is reduced to 0 or below the level of a requested wager for a game. For example, a player with 15 credits remaining on the credit meter may still be able to initiate a multiple game set of ten games at a wager of two credits per game (a total wager of 20 credits). If the player is not awarded any credits in the first seven games of the 10 game set, the game play may stop with one credit remaining on the credit meter 121. If the player inputs more credits in the gaming device 100, the final three games from the 10 game set may be automatically played, the player may be prompted as to whether or not she would like to play the remaining games from the game set, or the gaming device 100 may automatically end the previous 10 game set. This second option may be preferable because it is possible that the player will be awarded credits during some of the earlier games in the multiple game sets, in which case, the player may likely be able to complete the entire series of 10 games.

In a game display 120 of FIG. 4, in addition to the reels 122, two soft buttons are illustrated: a fast forward button 128 and a stop button 129. The fast forward button 128 may change the rate of game play between games with winning outcomes and games with losing outcomes. Additional details about the fast forward button 128 and the rate of game play are discussed below. The stop button 129 may be used by the player to stop or pause a multiple game set. For example, if a player had mistakenly pressed one of the higher multiple play game buttons 136-138 or had accidentally wagered more than she had expected on each game of a multiple game set, the player may have the chance to stop or pause a multiple game set that is in progress. For instance, if the player pressed the “Play 20 Games” button 138 and automatic play initiated on the gaming device 100, but then the player realized that she actually intended to press the “Bet 3” button 134, the player could halt play by pressing the stop button 129. In such a case, the gaming device 100 could display a message to the player in the game display 120 to determine the player’s desire. For instance, a message could be displayed that says:

> You pressed the STOP button. Press the STOP button again to cancel the requested games, or press the REPEAT BET button to resume the requested games.

In other embodiments, the stop button 129 could instead be a pause button (not illustrated), the pressing of which would cause the game currently executing on the gaming device 100 to temporarily pause. A similar message could be presented to the player to determine the player's desired action after pressing the pause button. In some embodiments, the stop or pause button 129 may only allow the player to alter a portion of the multiple game set. For example, if a pause button 129 was pressed during a multiple game set, the player may be given the option of altering the wagers made on future games in the multiple game set, but may be required to play the remaining games of the multiple game set. In this example, the player could use the pause button 129 as a tool to modify wagers during a multiple game set.

FIGS. 5A, 5B, 5C, 5D, and 5E are detail diagrams of the gaming device of FIG. 4 that together illustrate a game set according to embodiments of the invention. In particular, each figure of FIGS. 5A-5E illustrates a detail diagram of a gaming device after the sequential completion of a single game (gaming event) in a five game set. In this example, each of the automatically played games has a 2 credit wager placed on it. For example, referring back to FIG. 4, assume that there are 100 credits on the credit meter 121 and that the player has pressed the "Bet 2" wager button 134 and the "Play 5 Games" button 136. The discussion with reference to FIGS. 5A-5E describes in detail each of the steps taken by the gaming device 200 to implement this request made by the player.

Figure 5A:
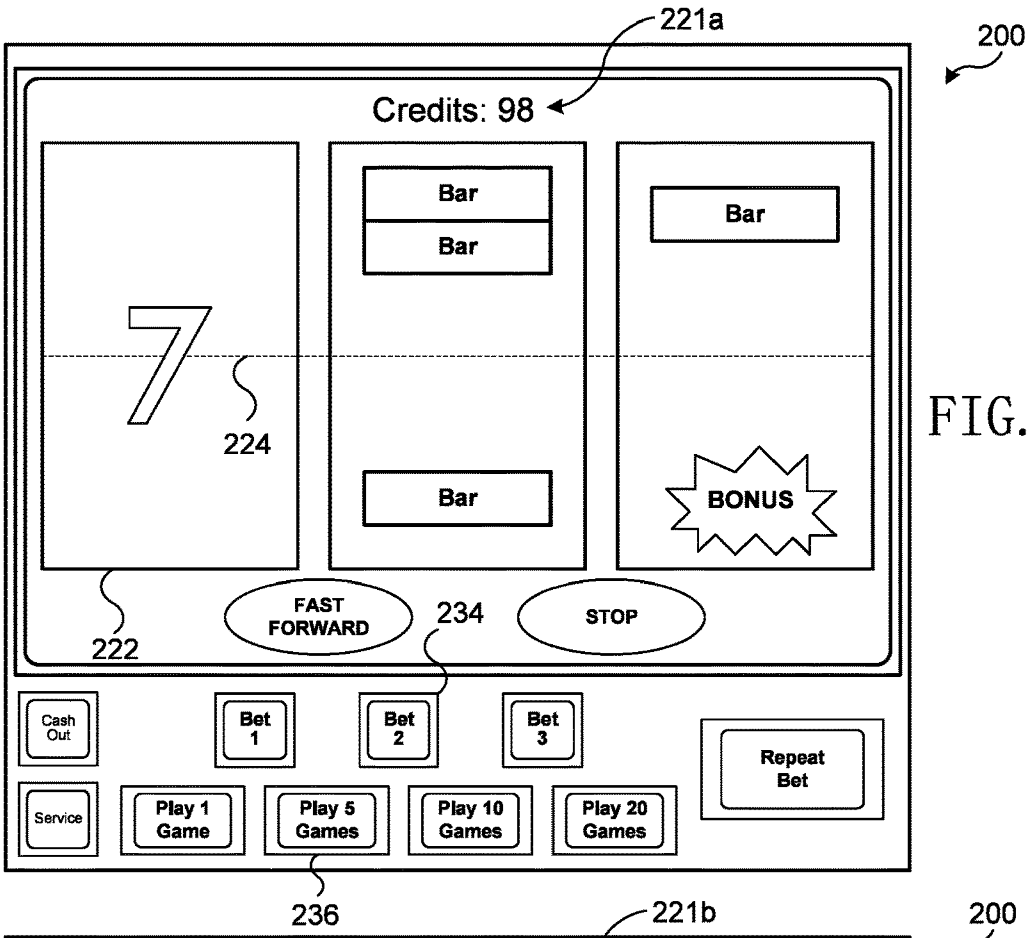
FIGS. 5A, 5B, 5C, 5D, and 5E are detail diagrams of the gaming device of FIG. 4 that together illustrate a game set according to embodiments of the invention.

Referring to FIG. 5A, the first gaming event of the requested set of game events is triggered by the player pressing the "Play 5 Games" button 136, as described above. Because the player had previously pressed the Bet 2" button 134, 2 credits are deducted from the credit meter 221*a* and are used as the wager on the first gaming event. Once the credits are deducted from the credit meter, the reels 222 spin, coming to a rest as illustrated in FIG. 5A. As illustrated in FIG. 5A, the first game is a losing game (e.g., it does not result in a winning combination of symbols appearing on the payline 224). The first game of the five game set is completed after the game result has been shown to the player. The credit meter 221*a* reflects that two credits have been wagered (on the first game) and no credits have been won. After the result of the first game is displayed for a short duration as illustrated in FIG. 5A, the gaming device 200 automatically proceeds to the second game, as illustrated in FIG. 5B.

Figure 5B:
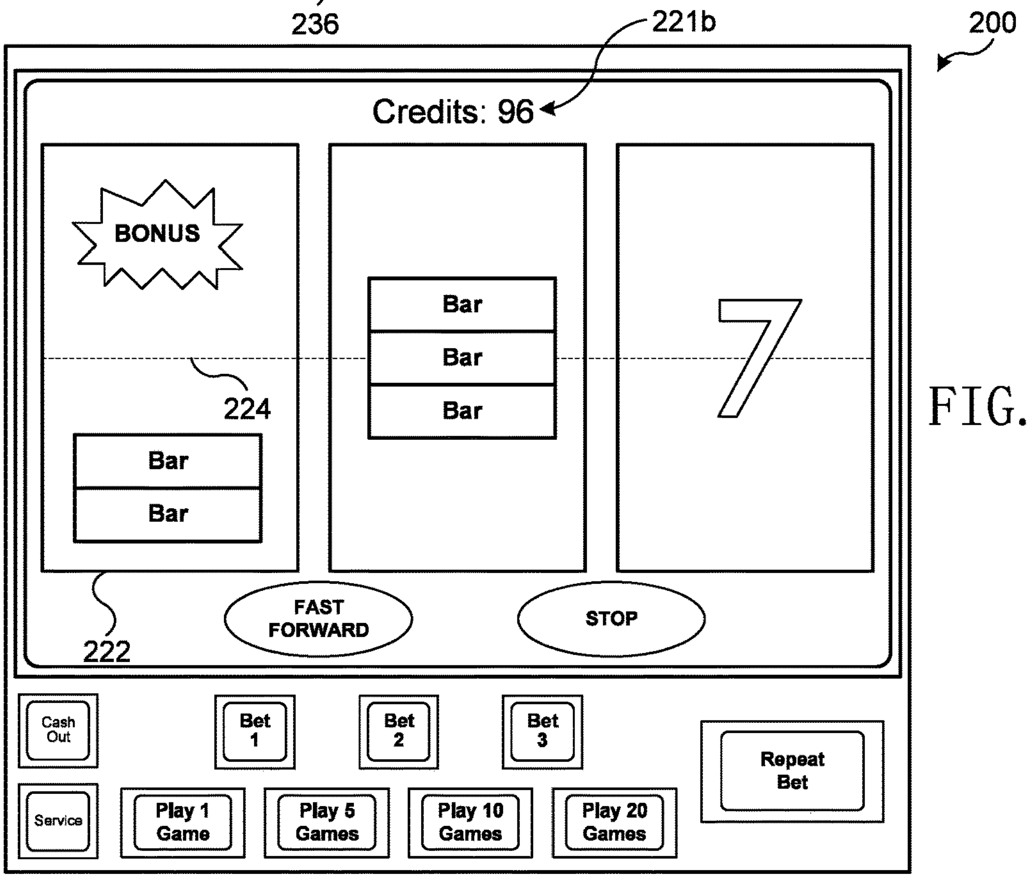

Referring to FIG. 5B, the second game proceeds by again deducting 2 credits from the credit meter 221*b* as a wager on the second gaming event, thereby dropping the total credits remaining on the credit meter to 96 credits. The reels 222 spin, and come to a rest as illustrated in FIG. 5B. Again this game result is a losing outcome, and no further action is taken by the gaming device with respect to the second game of the five game set. Note that the credit meter 221*b* reflects that a total of 4 credits have been wagered on the first and second gaming events and no credits have been awarded from the either of these gaming events. After waiting for another short duration, the gaming device 200 automatically proceeds to the third game of the set, as illustrated in FIG. 5C.

Figure 5C:
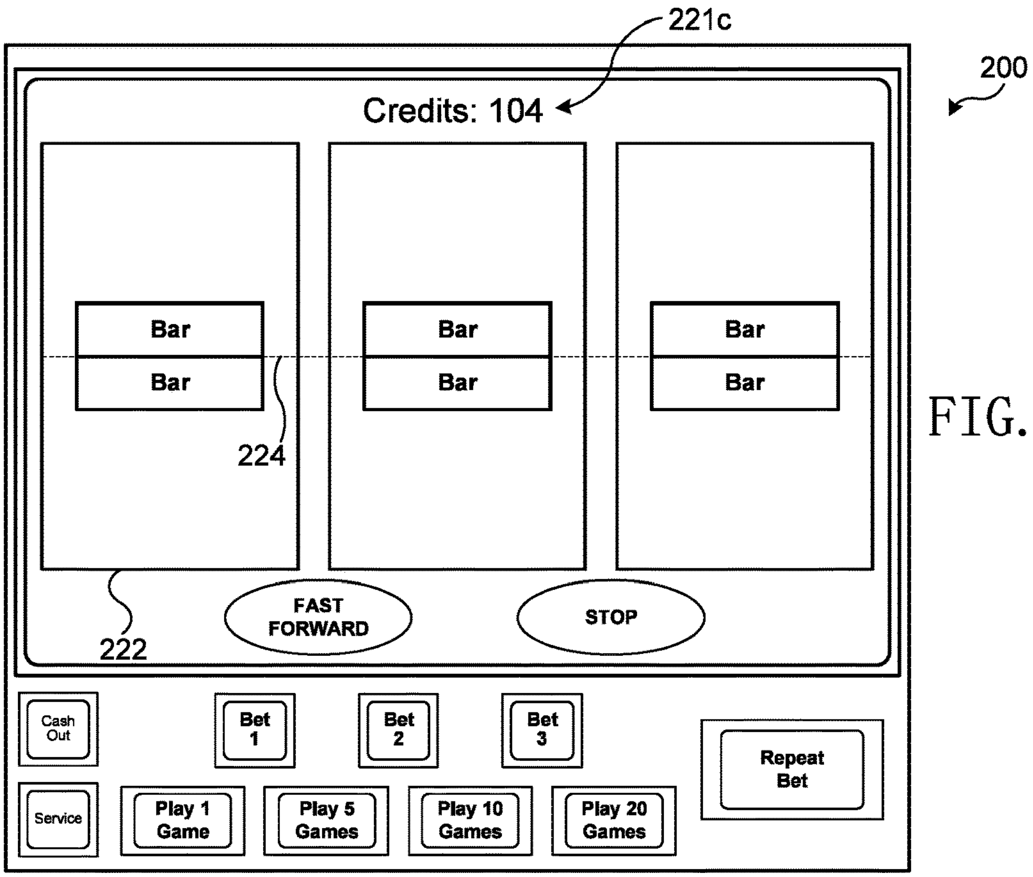

Referring to FIG. 5C, the third game of the game set is automatically initiated when the second game completes and 2 credits are again deducted from the credit meter 221*c* as a wager on the third game. The credit meter thus temporarily reflects that 94 credits (not illustrated) remain at this point in the game set. After the reels 222 spin and come to rest, the gaming device 200 recognizes that the payline 224 includes a winning combination of symbols (e.g., double bars) that is associated with a 10 credit award. The 10 credits won from the third game are automatically added to the 94 credits that were present after the wager had been deducted from the third game and are rolled up on the credit meter 221*c* to a total of 104 credits, as illustrated. After the credits are added to the credit meter 221*c*, the third game is complete, and the fourth game automatically starts, as illustrated in FIG. 5D.

Figure 5D:
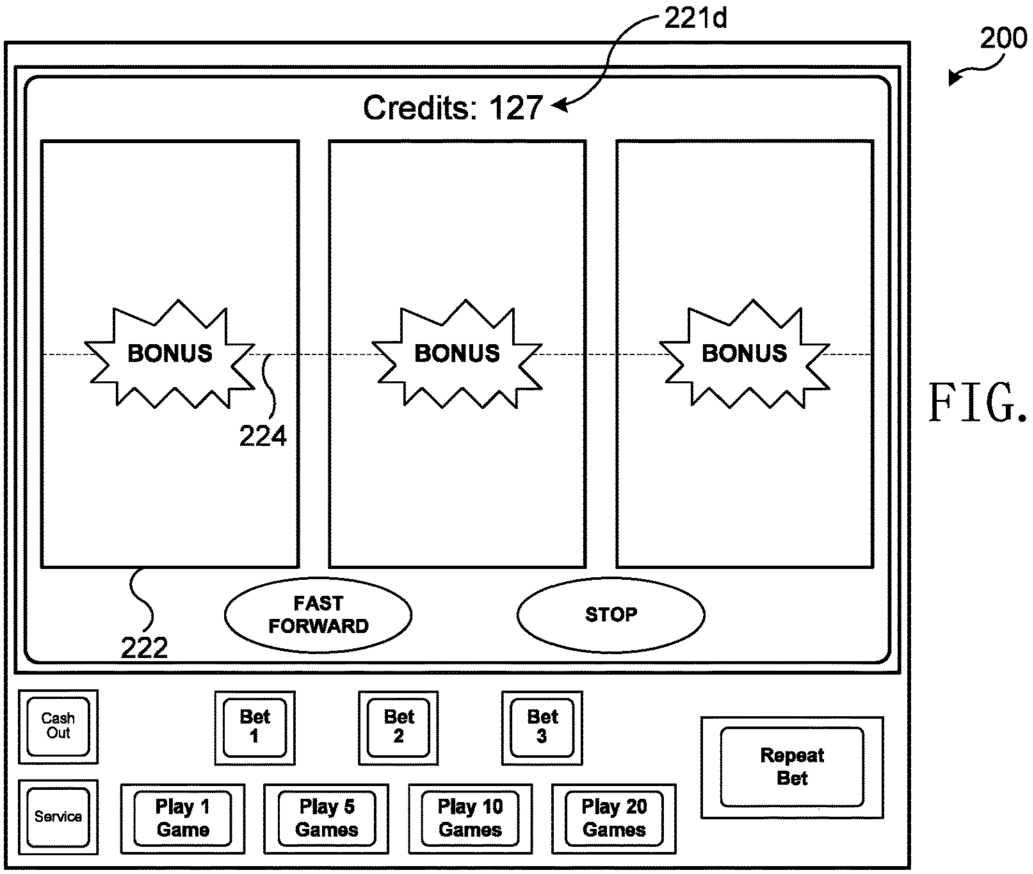

Referring to FIG. 5D, the fourth game of the game set is automatically initiated when the third game completes and 2 credits are again deducted from the credit meter 221*d* as a wager on the fourth game. The credit meter thus temporarily reflects that 102 credits (not illustrated) remain at this point in the game set. After the reels 222 spin and come to rest, the gaming device 200 recognizes that the payline 224 includes a combination of bonus symbols that is associated a bonus award. Because a bonus has been won as part of the fourth gaming event, the gaming device 200 automatically plays the bonus event without further player interaction after displaying the game result. In this example, assume that the bonus was a free spin of a bonus wheel having several available prizes. During the bonus spin, further assume that the bonus wheel stops on a 25 credit award. At the conclusion of the bonus event, the 25 credits won by the player in the bonus are added to the credit meter 221*d*, which is rolled up to 127 credits. The fourth game is completed at this point, and after a short pause, the fifth game in the game set is automatically initiated as illustrated in FIG. 5E.

Figure 5E:
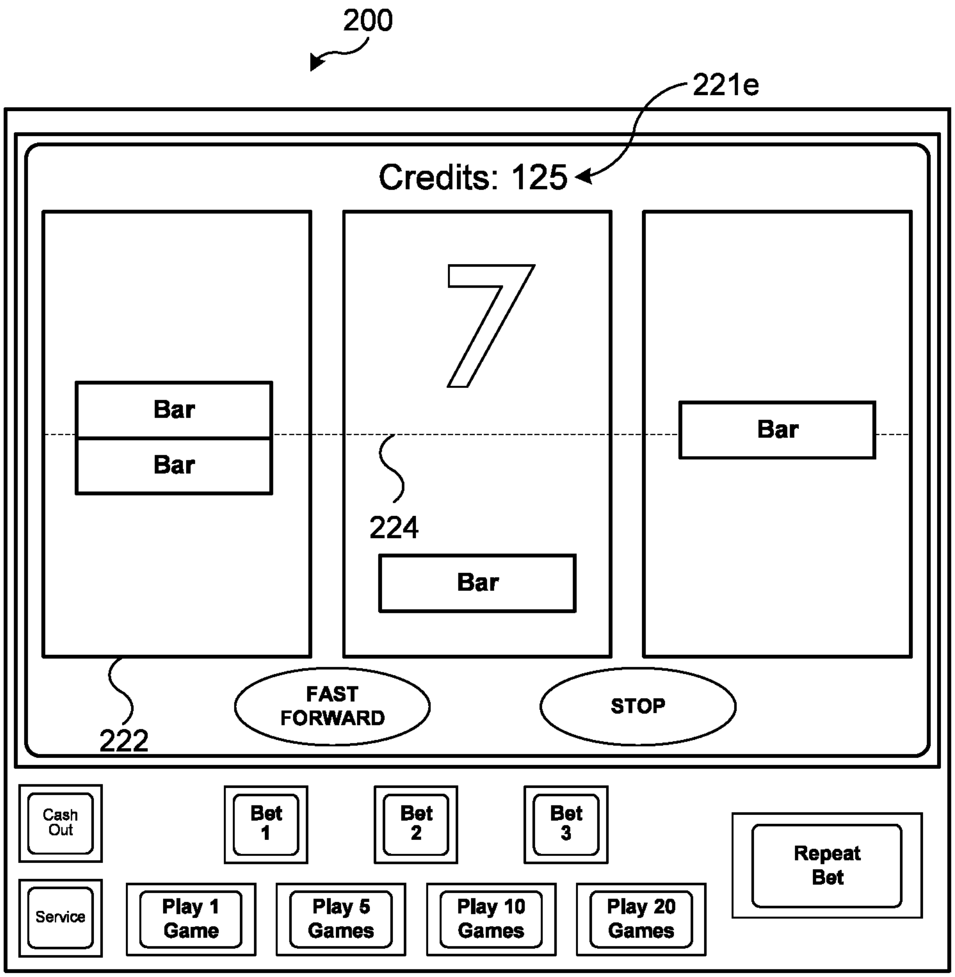

Referring to FIG. 5E, the fifth game proceeds by again deducting 2 credits from the credit meter 221*e* as a wager on the fifth gaming event, thereby dropping the total credits remaining on the credit meter to 125 credits. The reels 222 spin, and come to a rest as illustrated in FIG. 5E. This time the game result is a losing outcome, and no further action is taken by the gaming device 200 with respect to the fifth game of the five game set. Because this is the fifth and final game of the five game set, the gaming device 200 will remain in this state as illustrated in FIG. 5E until further player input is received.

The above description with reference to FIGS. 5A-5E is a relatively straightforward implementation of an embodiment of the invention. There are multiple variations possible without deviating from the scope of the invention. For instance, the above embodiment has been discussed where each wager on a game within a multiple game set is made immediately prior to the play of the corresponding game. However, in other embodiments, the entire amount wagered during a multiple game set may be immediately deducted from the credit meter 121 at the beginning of a multiple game set. For instance, in the above example illustrated in FIGS. 5A-5E, the entire wager of ten credits could have been deducted prior to the play of the first game in the five game set. In this case, the credit meter 221*a* in FIG. 5A would have shown 90 credits, the credit meter 221*b* in FIG. 5B would have shown 90 credits, the credit meter 221*c* in FIG. 5C would have shown 100 credits, the credit meter 221*d* in FIG. 5D would have shown 125 credits, and the credit meter 221*e* in FIG. 5E would again show 125 credits. Note that the final credit values on the credit meter 221*e* would be the same in either scenario. However, in the example described above, only wins would be added to the credit meter during the play of the games in the multiple game set. In yet other embodiments, the win amounts won during the multiple game set may not be added to the credit meter 221 until after the final game of the game set has been played.

Recall that the bonus in the fourth game (FIG. 5D) automatically initiated at the end of the fourth game in the embodiment described above. This configuration maintains the tie between the game or game event triggering the bonus and the bonus play itself while not slowing down game play or requiring player interaction with the gaming device. However, in other embodiments, the bonus may request that a player to press a "SPIN" button to initiate the bonus wheel, or may specify a variety of player interactions as necessitated by the other bonus types. Requiring some player interaction may be favorable in certain situations because the player may feel more "connected" to the bonus experience. Additionally, since players are typically excited about receiving bonuses, having player interaction during the bonus may provide an opportunity to let the player spend a little extra time in the bonus as well as extra excitement. Certain embodiments may include gaming devices that are configured to automatically play and/or pay minor bonuses awarded during a game set, while requiring player interaction for larger valued and/or more complicated bonuses awarded during the game set.

In an alternate embodiment, all bonuses are held until the end of the last game in the game set. For instance, if the player selected a set of 10 games and bonuses were won on the third, sixth, and seventh games, the bonus games would all be held until the end of the tenth game of the set. At that time, the gaming device 200 could indicate to the player that the player had won 3 bonuses during the game set, especially if the bonuses were not readily apparent from the game play itself (e.g., mystery bonuses). In one version of this embodiment, the three bonus games would automatically start at the conclusion of the tenth game, and would also complete automatically. Thus, in this version, after the player had pressed the bet 10 button, the game 200 would play all 10 games and all 3 bonus games automatically without further input from the player. In another version, the gaming device 200 informs the user how many bonus games he or she has won at the conclusion of the tenth game. Then, the gaming device 200 could request a separate player input, for example, pressing a spin button, to initiate all or each one of the 3 bonus games.

In another alternate embodiment, the gaming device 200 may be configured to automatically "rearrange" the outcomes of the games in the game set to provide a more scripted play sequence for the player. In the previous embodiments, the gaming device 200 may have been configured to randomly determine the outcome of each gaming event individually at the beginning of each game (e.g., randomly determine the outcome of the first game, play the first game, randomly determine the outcome of the second game, play the second game, etc.), or the gaming device 200 may have been configured to determine all of the game outcomes for the game set immediately after the player had pressed one of the multiple game set initiation buttons (e.g., randomly determine the outcome of games 1-10, play the first game using the first determined outcome, play the second game using the second determined outcome, etc.). In either case, each of the games are presented to the player in the natural order of the selection of the random outcomes by the gaming device 200.

In a rearrangement embodiment, the gaming device 200 would begin by determining the outcomes of the games in the game set i.e., determining all of the game outcomes prior to playing any of the games. However, instead of simply matching the first determined outcome to the first game displayed and so on, this rearrangement configuration would analyze the determined game outcomes and rearrange them in certain sequences dictated by design criteria. For game speed and ease, this analysis and rearrangement may be done at the game device level, for example, by the game processor 40 of FIG. 1A. However, the analysis and rearrangement may be done by a remote controller or server, for example, by the game network server 80 of FIG. 3, when using certain game configurations such as server based gaming, or when using certain design criteria, such as those controlled by details of a player account.

The design criteria used to rearrange the game outcomes may emphasize different sequence characteristics based on the time of day, day of the week, and/or stored information about the player (e.g., from a player account or immediately preceding game play), etc. For instance, the design criteria may specify that wins occurring in the game set should be pushed to the beginning of the game set so the player has an early feeling of success that carries through the game set. Alternatively, the design criteria may specify that wins occurring in the game set should be pushed to the end of the game set so that the player finishes the set on a winning note. The design criteria may specify splitting wins, bunching wins, or any other variety of arranging the game outcomes in the game set to emphasize some feel of the gaming experience. For example, referring to the embodiment in FIGS. 5A-5E, assume a design criteria specified that the game outcomes should be arranged so that the winning outcomes appeared near the end of the game sequence to build excitement; the casino or game device may even advertise this feature. In this example, the symbol win in FIG. 5C may be moved to the fourth game, the bonus win shown in FIG. 5D may be moved to the last (fifth) game, and the loss shown in FIG. 5E may be moved to the third game. If the player is aware of the game configuration, the player may become excited when he receives a 10 credit win on the fourth game (illustrated in FIG. 5C) because the player knows that in addition to this win he will have another, and possibly better, win in the last (fifth) game.

In another example, assume that the player presses the "Play 10 Games" button to request a multiple game set of 10 games on the gaming device 200. If the gaming device 200 was configured to use the automatic rearrangement option, the gaming device 200 determines the outcome of all 10 of the requested games before or simultaneously with spinning the reels for the first game. The gaming device 200 then determines in which order it will present the 10 automatically played games to the player. For instance, the gaming device 200 may be configured such that a design criteria specifies that all of the games with losing outcomes are to be grouped at the beginning of the ten game set. As with the example above, the player would see each of the losing outcomes before the first winning outcome is shown. For example, if there are three winning outcomes in games 2, 6, and 7, and all of the rest of the games having losing outcomes, the gaming device may rearrange the presentation of the games so that the first seven games indicate a losing outcome to the player and save the winning outcomes for the final three game presentations. As noted above, such rearranging may build excitement for the player by ending on a positive note.

In yet another embodiment, the gaming device 200 may be configured to include design criteria that specifies that the winning and losing games of the requested set of automatic games is to be rearranged to split wins and weight the end of the game set with more wins. Again such a design criteria may be created to build player excitement while preventing the player from having multiple consecutive losing outcomes. For example, assume that the player has requested 10 games and the winning games were originally games 1, 5, and 6. The gaming device may rearrange the wins so that they appear in games 3, 8, and 10. This embodiment may differ from the embodiment addressed directly above because the player realizes at least one win early in the set of games, and still ends up on a winning note. Note that the gaming device 200 has not altered any of the outcomes of the set of games. It merely alters the order in which the game outcomes are presented to the user.

In yet another embodiment, which may be used for a gaming device 200 configured to "rearrange" the game order or configured to play the games in their "original" order, the gaming device 200 is configured to play games with certain outcomes at a different speed than games having other outcomes. To activate this feature, the player may press the "Fast Forward" button 128 (FIG. 4). Once activated, subsequent sets of games may use varying speeds of play between preferred outcomes and non-preferred outcomes. The player may have the option to de-select this feature after a game set has completed, or may be able to select or de-select the feature during a pause or stop in the game set initiated by the activation of the "Stop" button 129.

In one example, the games with losing outcomes may be played at a much faster rate than games having winning outcomes. For instance, games with winning outcomes may take 2-5 seconds to spin the reels and stop on a winning payline, while losing outcomes may spin the reels faster so that the losing outcomes can be displayed in less than 1 or 2 seconds. In some embodiments, losing games may not include spinning the reels at all. For example, if there are seven losing outcomes, the gaming device 200 may group all of the losses as the first seven games, debit the credit meter 221 the appropriate amount, then only spin the reels for the three winning games. In such an embodiment, the only indication to the player that the games have been played is that the credit meter 221 is decremented. Because this may discourage the player, the gaming device 200 may include some notice or feedback to the player, such as a quick spin of the reels including a simultaneous stop of all the reels, as opposed to the more typical sequentially stopping, for each of the games. Such a system would give notice to the player that the game had a losing outcome, but may be less abrupt than simply removing credits from the meter. Multiple variations of this concept are described in co-pending U.S. patent application Ser. No. 12/204,633, filed Sep. 4, 2008, entitled GAMING DEVICE HAVING VARIABLE SPEED OF PLAY, the teachings of which are incorporated herein by reference.

Figure 6:
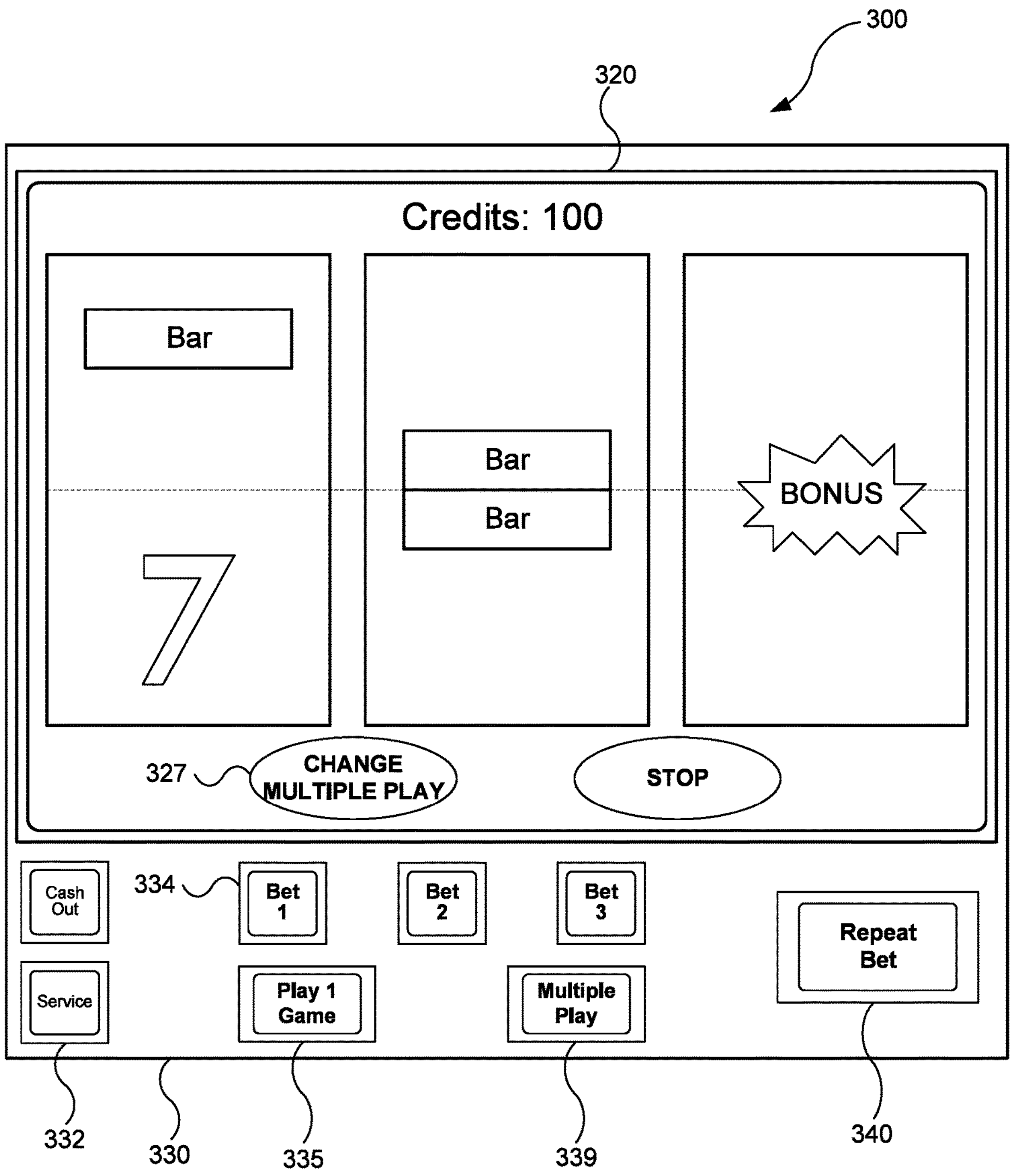
FIG. 6 is a detail diagram of another gaming device according to embodiments of the invention.
Figure 7A:
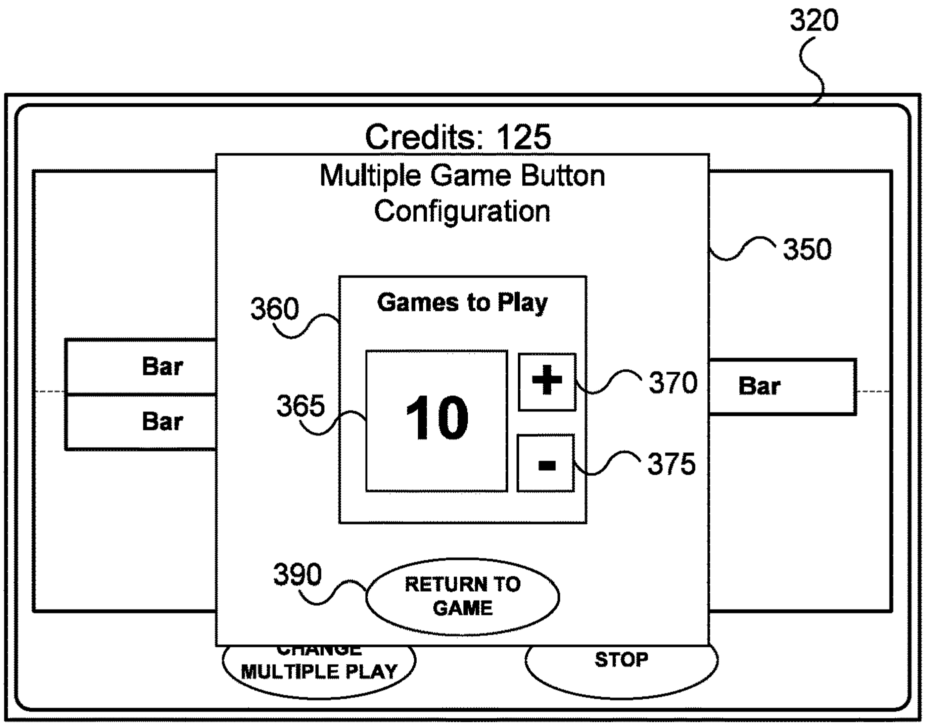
FIGS. 7A and 7B are detail diagrams of a game display of the gaming device of FIG. 6 that illustrate exemplary configurations screens according to embodiments of the invention.
Figure 7B:
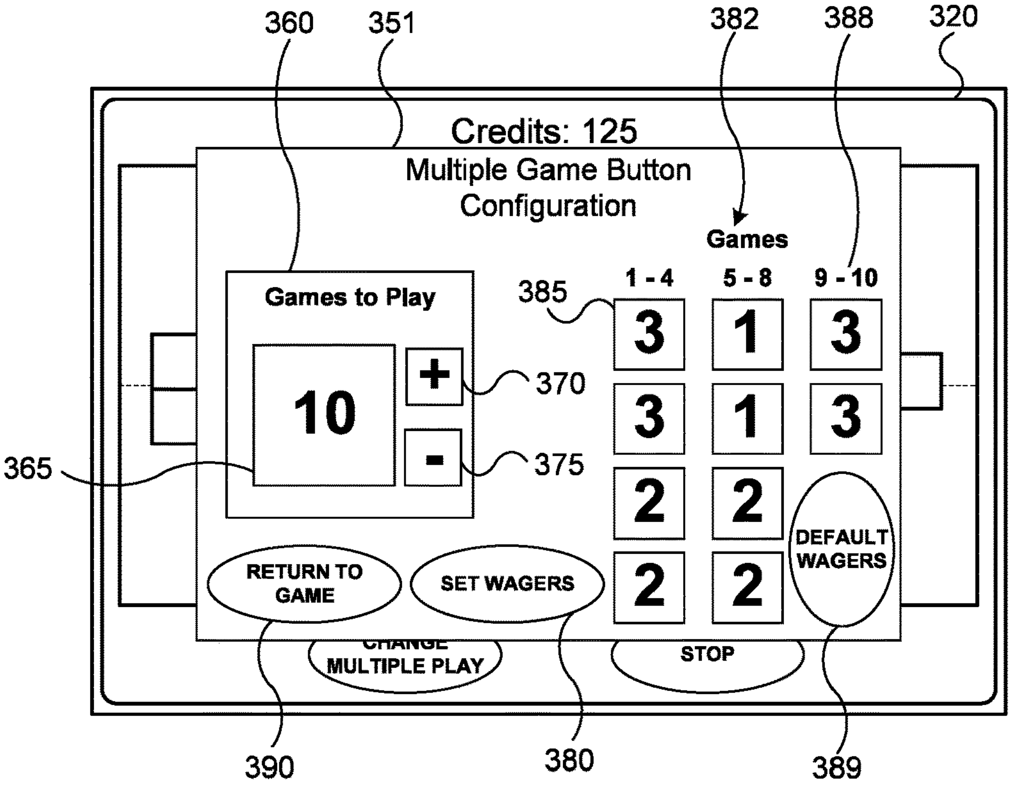

FIG. 6 is a detail diagram of another gaming device according to embodiments of the invention. FIGS. 7A and 7B are detail diagrams of a game display of the gaming device of FIG. 6 that illustrate exemplary configurations screens according to embodiments of the invention.

Referring to FIGS. 6 and 7A a gaming device 300 includes a multiple game initiation button ("Multiple Play" button) 339. Unlike, the embodiment described with reference to FIG. 4 that included several multiple game initiating buttons 136-138, each corresponding to game sets with specific and unique numbers of included games, the gaming device 300 illustrated in this embodiment provides only a single multiple game initiation button 339. The use of a single multiple game initiation button 339 on a player interface panel 330 may reduce the clutter of the player interface panel and be less confusing to new players. The player interface panel 330 may still include a "Play 1 Game" game initiation button 335, one or more wager buttons 334, a "Repeat Bet" button 340, and one or more game buttons 332, which may be similar to the corresponding buttons described above with reference to FIG. 4.

In some embodiments, the "Multiple Play" button 339 may play a predetermined number of games that is set by a casino. For example, the gaming device 300 may set up and advertised as including a play 10 game feature that has a better payback percentage than the payback percentage of a single game play. In this example, the label of the multiple game initiation button 339 may be altered to reflect the number of games played in a game set (such as the "Play 10 Games" button 137 illustrated in FIG. 4). If the casino modifies the number of games included in a multiple game set, the label may simply be replaced by switching out the printed label or instructing the gaming device 300 to dynamically alter a display screen (not shown) in the multiple game initiation button 339. The casino may decide to modify the number of games included in a multiple game set based on general player response to the game, the time of day, day of the week, or as part of another promotion. Additionally, the number of games may be set automatically by the gaming device 300 in response to predetermined triggering events. These triggering events may relate to environmental factors (e.g., time of day), may relate to game play (e.g., consecutive game sets including all losing games), or may relate to the identification of a player (e.g., identified player generally prefers game sets with 20 games played per game set).

In other embodiments, the "Multiple Play" button may be configurable by a player so that the player can set the number of games played in each game set. In some embodiments, the player may be asked how many games she wants to play after the player presses the "Multiple Play" button 339 prior to initiating the first game of the game set. In alternate embodiments, the player would use a "Change Multiple Play" button 327 located on the player interface panel 330 or on the game display 320 as illustrated in FIG. 6. When the player presses the "Change Multiple Play" button 327, the gaming device 300 brings up a display screen, such as display screen 350 of FIG. 7A, to receive player input. Of course, the display screen 350 can be embodied in many different formats, such as being a complete second screen on the game display 320 or appearing on a secondary screen 25 (FIG. 1A), player tracking screen, etc.

The display screen 350 includes a query box 360 to determine how many games the player wishes to have the gaming device 300 automatically play. A number box 365 or some other feedback mechanism is pre-populated with a number representing the present number of games that will be included in a game set upon activation of the "Multiple Play" button 339. The user can use adjustment buttons 370, 375 to increase or decrease the number within the number box 365. After the number in the number box equals the number of games that the player wishes the gaming device 300 to automatically play, the player presses a return button 390 ("Return to Game" button) to return to the main game display. The player may then either press the "Multiple Play" button 339 or the "Repeat Bet" button 340 to cause the gaming device 300 to automatically play the selected number of games. Although the embodiment shown in FIG. 7A illustrate a query box 360 having a single number box 365, other embodiments may include a display screen having a series of selectable numbers, such as 5, 10, 15, 20, that the player can select as the desired number of automatically repeated games. Numerous other variations exist for receiving a player selection of a number of games to automatically play in a game set, such as using a physical key pad, a soft key pad in the display screen 350, scrollable lists of numbers, etc., which are all contemplated by this concept.

In other embodiments, a player may store a preconfigured number in a player account associated with the player. Here, the preconfigured number is downloaded to the gaming device 300 and set as the number of games to automatically play in a game set in response to the game device identifying the player. A confirmation screen (not shown) may appear to confirm that the player would like to keep this preconfigured number as the number of games to play in a multiple game set. The confirmation screen may also allow the player to set or modify a preferred game number for future use. Additionally, the desired number of games stored in the player account can be set or modified over the Internet, a casino kiosk, or using other methods that allow players to set and modify player account preferences.

Referring to FIGS. 6 and 7B, a further variation of a gaming device 300 is illustrated where the player may set both the number of games to play in a game set and the wager to place on each game within that game set. Recall that in the previously discussed embodiments, the player selected one particular wager, such as bet 2, which was used for all the games that were automatically played by the gaming device. The embodiment illustrated in FIG. 7B may be preferable to players that want additional control over how much they wager on each game of a game set. For example, suppose a player has a gut feeling that the first few games and last few games of a game set are going to be higher paying than the games in the middle of a game set. This player may wish to allocate additional wagers on the games they feel have a better chance of winning and reduce the wagers on other games in the game set.

In FIG. 7B, a display screen 351 includes both a inquiry box 360 to ascertain the number of games the player wishes to have in a multiple game set and provides the player with the option to control the amount wagered on each of the specified games in the game set. The inquiry box 360 may be manipulated by the player to input the desired number of games as described above with respect to FIG. 7A. The display screen 351, however, further includes a "Set Wagers" button 380. The player may press the "Set Wagers" button 380 to bring up a game wager portion 382 of the display screen 351. The game wager portion 382 of the display screen 351 may include a list of games 388 and an indication of the wagers 385 currently corresponding to each game. Although FIG. 7B illustrates the game list and wagers in a column style format, any display technique may be used to display this information and receive a player's wager selections for each game in a multiple game set.

In operation, the wagers 385 may reflect the wager amount previously used on the game device 300, or a default wager value. The player may press one of the wager buttons 334 on the player interface panel 330 to set the wager amounts for each of the games to a particular amount between game sets. To set the wager value for an individual game, the player may press the wager value 385 to cycle between different available wager amounts. For example, if the player pressed the wager value 385 corresponding to the first game, the wager amount may change from "3" to "1." If the player pressed the same wager value again, the wager amount would change from "1" to "2." In other embodiments, the player may touch the wager value 385 and another display screen (not shown) may appear with a number box and adjustment buttons so that the player can modify the wager amount. Alternatively, the wager values 385 in the wager display portion 382 may include corresponding adjustment buttons (not shown) to modify the wager amounts. Additionally, a "Default Wagers" button 389 may be present in the wager display portion 382. The "Default Wagers" button 389 may restore a basic wagering scheme for all of the games of the game set, such as one credit wagered for each game, or may restore a player-specified default wagering scheme. In FIG. 7B, a player has selected 10 games to be played in a game set and has specified that the first 2 games will have 3 credits wagered, games 3 and 4 will have 2 credits wagered, games 5 and 6 will have 1 credit wagered, games 7 and 8 will have 2 credits wagered, and games 9 and 10 will have 3 credits wagered.

Figure 8:
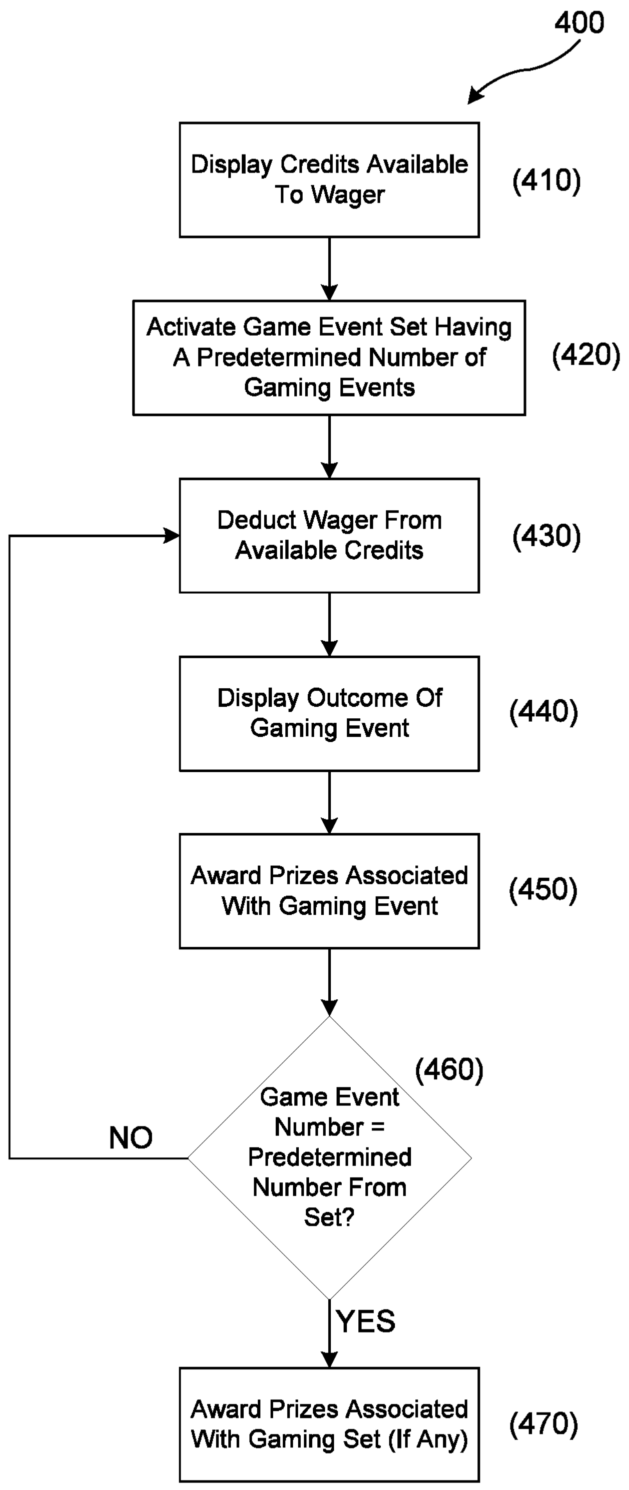
FIG. 8 is a flow diagram illustrating an example method of operating a gaming device according to embodiments of the invention.

FIG. 8 is a flow diagram illustrating an example method of operating a gaming device according to embodiments of the invention.

Referring to FIG. 8, an example flow 400 begins by displaying credits available to the player to wager in a process 410. Typically the credits are displayed on a credit meter, such as the credit meter 121 of FIG. 4, but other methods may be used. In most embodiments, the credit meter is continuously shown to the user to indicate how many credits are available on the gaming device. In a process 420, the gaming device accepts input from the player indicating that the player wishes to have the gaming device automatically play a set of games or gaming events. Typically a player would press a particular button on the gaming device indicating how many games the player wishes to play. For example, the player may press a "Play 5 Games" button or a "Play 10 Games" button to indicate that the player wishes the gaming device to automatically play 5 or 10 games respectively. In the process 420, the first gaming event is activated.

In a process 430, a wager is deducted from the available credits that were displayed to the player in the process 410 above. In a process 440, the gaming device plays a gaming event and displays an outcome of the gaming event corresponding to the wager from process 430. The outcome may be a losing outcome or a winning outcome. In some cases, the winning outcome may also include a bonus round or bonus outcome. In such a case, as described above, playing the bonus may be held until the end of the set of game events, or may be immediately played after the particular gaming event. In a process 450, any prizes associated with the gaming event displayed in the process 440 are delivered to the player. Typically, this means credits are added to the credit meter, although other prizes are possible, such as free plays, non-game bonuses such as free meals or tickets, discount coupons or others as is known in the art. In a process 460, the flow 400 determines whether the final game event in the set of multiple games has been played. If not, then the flow 400 returns to the process 430 to play the next game in the set. The processes 430, 440, 450, and 460, are repeated until the final game of the set has been played. A final process 470 awards further prizes, if any, associated with the game event set.

The process 470 may include bonus awards for certain occurrences that happen during the game set. For example, a consolation award may be given to a player that receives no wins in a game set. Alternatively, a bonus award may given to a player that receives a large number of wins in a game set. In another embodiment, a special symbol may be counted each time it appears in a game result on the game display during a game set. At the end of the game set, the special symbol count may be analyzed to see if it reaches above one or more thresholds that trigger a bonus value. For example, the player may be awarded a point each time the BONUS symbol appeared in a game result on the gaming display 120 (FIG. 4) or on the payline 124 regardless of whether or not the game result was associated with an award. At the end of a 10 game set the player may have accumulated 8 Bonus points. If a Bonus point paytable paid 1 credit for 5 or more Bonus points, 2 credits for 10 or more Bonus points, and 5 credits for 15 or more Bonus points, the player would have earned an extra 1 credit times the number of credits wagered per game. This embodiment may encourage players to play game sets with higher numbers of games since they would have an increased chance of accumulating enough Bonus points to be awarded extra credits. Other incentives provided to the player to play multiple game sets may include higher paying paytables for games played in multiple game sets, bonuses only available in the multiple game sets, additional player points awarded for playing multiple game sets, etc., which may be implemented using conventional techniques in the art using the description of the inventive concepts described above.

In other embodiments, a bonus may be triggered during the gaming events in the multiple game set that automatically initiates another multiple game set. This bonus multiple game set may not require in further wagers from the player. Hence, no wagers would be deducted before each of the gaming events in the bonus game set. In some embodiments, the player would be given the same number of gaming events in the bonus game set as they choose with the prior multiple game set. Hence, the more games played in the multiple game set, the more free games would be given in the bonus game set. The paytable in the bonus game set may also be changed from the paytable used in the multiple game set. By lowering the payback percentage in the paytable used in the bonus game set, the gaming device may be able to award the bonus game set more often while maintaining profits for the casino. By increasing the payback percentage in the paytable used in the bonus game set, the gaming device may be able to provide a richer and more exciting bonus to the players, even if the bonus game set was awarded less frequently. Some embodiments may further provide a means to re-trigger another bonus game set during a present bonus game set. Hence, a player may be awarded more than one bonus game set either from multiple bonus triggering events occurring during the multiple game set or from one or more re-triggering events occurring during the bonus game sets.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A method comprising:

determining a player account associated with one or more wagers received by an electronic gaming device;

outputting a selectable option configured to indicate one or more game instances of a game associated with the electronic gaming device;

assigning, to each game instance of the one or more game instances, based on a selection of the selectable option, one or more portions of the one or more wagers;

executing the one or more game instances of the game;

based on executing the one or more game instances, determining one or more game outcomes; and transferring, based on the one or more game outcomes and the one or more wagers, credits to the player account.

2. The method of claim 1, wherein the one or more wagers are received via one or more of: a low power communications module, an internet connected module, a cash acceptor, coin acceptor, token acceptor, credit transfer, or electronic funds transfer.

3. The method of claim 1, wherein the each portion of the one or more portions comprises a different amount.

4. The method of claim 1, wherein at least one portion of the one or more portions is an amount different than one or more remaining portions of the one or more portions.

5. The method of claim 1, further comprising displaying one or more outcomes.

6. The method of claim 1, further comprising:

based on executing the one or more game instances, determining a final game instance; and prior to executing the final game instance, outputting a second selectable option.

7. The method of claim 1, further comprising:

receiving a player identifier; and assigning, based on the player identifier, the one or more portions to the one or more game instances.

8. One or more non-transitory computer-readable media storing processor-executable instructions thereon, which, when executed by at least one processor cause the at least one processor to:

determine a player account associated with one or more wagers received by an electronic gaming device;

output a selectable option configured to indicate one or more game instances of a game associated with the electronic gaming device;

assign, to each game instance of the one or more game instances, based on a selection of the selectable option, one or more portions of the one or more wagers;

execute the one or more game instances of the game;

based on executing the one or more game instances, determine one or more game outcomes; and transfer, based on the one or more game outcomes and the one or more wagers, credits to the player account.

9. The one or more non-transitory computer-readable media of claim 8, wherein the one or more wagers are received via one or more of: a low power communications module, an internet connected module, a cash acceptor, coin acceptor, token acceptor, credit transfer, or electronic funds transfer.

10. The one or more non-transitory computer-readable media of claim 8, wherein the each portion of the one or more portions comprises a different amount.

11. The one or more non-transitory computer-readable media of claim 8, wherein at least one portion of the one or more portions is an amount different than one or more remaining portions of the one or more portions.

12. The one or more non-transitory computer-readable media of claim 8, wherein the processor-executable instructions, when executed by the at least one processor, further cause the at least one processor to display one or more outcomes.

13. The one or more non-transitory computer-readable media of claim 8, wherein the processor-executable instructions, when executed by the at least one processor, further cause the at least one processor to:

based on executing the one or more game instances, determine a final game instance; and prior to executing the final game instance, output a second selectable option.

14. The one or more non-transitory computer-readable media of claim 8, wherein the processor-executable instructions, when executed by the at least one processor, further cause the at least one processor to:

receive a player identifier; and assign, based on the player identifier, the one or more portions to the one or more game instances.

15. An apparatus comprising:

one or more processors; and memory storing processor-executable instructions that, when executed by the one or more processors, cause the apparatus to:

determine a player account associated with one or more wagers received by an electronic gaming device;

output a selectable option configured to indicate one or more game instances of a game associated with the electronic gaming device;

assign, to each game instance of the one or more game instances, based on a selection of the selectable option, one or more portions of the one or more wagers;

execute the one or more game instances of the game;

based on executing the one or more game instances, determine one or more game outcomes; and transfer, based on the one or more game outcomes and the one or more wagers, credits to the player account.

16. The apparatus of claim 15, wherein the one or more wagers are received via one or more of: a cash acceptor, coin acceptor, token acceptor, credit transfer, or electronic funds transfer.

17. The apparatus of claim 15, wherein the each portion of the one or more portions comprises a different amount.

18. The apparatus of claim 15, wherein at least one portion of the one or more portions is an amount different than one or more remaining portions of the one or more portions.

19. The apparatus of claim 15, wherein the processor-executable instructions, when executed by the one or more processors, further cause the one or more processors to display one or more outcomes.

20. The apparatus of claim 15, wherein the processor-executable instructions, when executed by the one or more processors, further cause the one or more processors to:

based on executing the one or more game instances, determine a final game instance; and prior to executing the final game instance, output a second selectable option.

* * * * *